(12) United States Patent
Tseng et al.

(10) Patent No.: US 11,014,268 B2
(45) Date of Patent: May 25, 2021

(54) 3D PRINTING OF PIEZOELECTRIC CERAMIC PARTICLE/FLUOROPOLYMER NANOCOMPOSITES WITH IN-SITU POLING FOR SENSOR APPLICATIONS

(71) Applicants: Tzu-Liang Tseng, El Paso, TX (US); Yirong Lin, El Paso, TX (US); Hoejin Kim, El Paso, TX (US)

(72) Inventors: Tzu-Liang Tseng, El Paso, TX (US); Yirong Lin, El Paso, TX (US); Hoejin Kim, El Paso, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 231 days.

(21) Appl. No.: 16/038,873

(22) Filed: Jul. 18, 2018

(65) Prior Publication Data
US 2019/0054659 A1  Feb. 21, 2019

Related U.S. Application Data

(60) Provisional application No. 62/536,290, filed on Jul. 24, 2017.

(51) Int. Cl.
*D01D 1/02* (2006.01)
*D01D 5/08* (2006.01)
(Continued)

(52) U.S. Cl.
CPC .............. *B29B 11/10* (2013.01); *B33Y 70/00* (2014.12); *D01F 1/10* (2013.01); *D01F 6/12* (2013.01);
(Continued)

(58) Field of Classification Search
CPC ....... B29B 11/10; B29C 48/022; B29C 48/05; B29C 48/2888; B29C 2793/0063; B29D 99/0078; B29K 2027/12; B29K 2027/14; B29K 2027/16; B29K 2027/18; B29K 2105/002; B29K 2105/162; B29K 2105/167; B29K 2507/04; B29K 2509/02; B29K 2995/0003; B29L 2031/731; C08J 3/09; C08J 3/091; C08J 3/092; C08J 3/093; C08J 3/095; C08J 3/096; C08J 3/097;
(Continued)

(56) References Cited

U.S. PATENT DOCUMENTS

2015/0134061 A1*  5/2015  Friis .................. B29C 48/022
264/439 X
2019/0284423 A1*  9/2019  Bodkhe .................... C08J 3/20

OTHER PUBLICATIONS

Ahn, et al., "Enhanced Piezoelectric Properties of Electrospun Poly (Vinylidene Fluoride)/Multiwalled Carbon Nanotube Composites Due to High β-Phase Formation in Poly (Vinylidene Fluoride)," *The Journal of Physical Chemistry C*, 117(22); 11791-11799, 2013.
(Continued)

*Primary Examiner* — Leo B Tentoni
(74) *Attorney, Agent, or Firm* — Norton Rose Fulbright US LLP

(57) ABSTRACT

Embodiments of the invention are directed to methods, devices, and compositions for 3D printing of piezoelectric devices. The piezoelectric devices can be used for sensor applications using poly(vinylidene) fluoride (PVDF) and BaTiO₃ (BTO) nanocomposites through in-situ electric poling 3D printing process.

9 Claims, 19 Drawing Sheets

(51) Int. Cl.

| | |
|---|---|
| B29B 11/10 | (2006.01) |
| B33Y 70/00 | (2020.01) |
| D01F 1/10 | (2006.01) |
| D01F 6/12 | (2006.01) |
| B33Y 10/00 | (2015.01) |
| B29K 27/00 | (2006.01) |
| B29K 507/04 | (2006.01) |
| B29K 105/16 | (2006.01) |
| B29C 64/118 | (2017.01) |
| B29K 509/02 | (2006.01) |
| B29C 48/05 | (2019.01) |
| B29C 48/30 | (2019.01) |
| D01F 1/09 | (2006.01) |
| B29C 48/00 | (2019.01) |
| B29K 309/02 | (2006.01) |
| B29C 48/86 | (2019.01) |
| B29C 48/155 | (2019.01) |
| B29C 48/285 | (2019.01) |

(52) U.S. Cl.
CPC ............ B29C 48/022 (2019.02); B29C 48/05 (2019.02); B29C 48/155 (2019.02); B29C 48/2888 (2019.02); B29C 48/30 (2019.02); B29C 48/865 (2019.02); B29C 64/118 (2017.08); B29K 2027/16 (2013.01); B29K 2105/162 (2013.01); B29K 2309/02 (2013.01); B29K 2507/04 (2013.01); B29K 2509/02 (2013.01); B29K 2995/0003 (2013.01); B33Y 10/00 (2014.12); D01F 1/09 (2013.01)

(58) Field of Classification Search
CPC ... C08J 3/098; C08J 3/20; C08J 3/203; D01D 1/02; D01D 5/08; D01D 5/42; D01D 5/423; D01D 5/426; D01F 1/09; D01F 1/10; D01F 6/12; D10B 2321/042; D10B 2401/18
USPC ............................. 264/104, 147, 210.6, 211
See application file for complete search history.

(56) References Cited

OTHER PUBLICATIONS

Benz & Euler, "Determination of the Crystalline Phases of Poly (Vinylidene Fluoride) Under Different Preparation Conditions Using Differential Scanning Calorimetry and Infrared Spectroscopy," *Journal of Applied Polymer Science*, 89(4); 1093-1100, 2003.

Bharti, et al., "Ferroelectric Hysteresis in Simultaneously Stretched and Corona-Poled PVDF Films," *IEEE Transactions on Dielectrics and Electrical Insulation*, 4(6); 738-741, 1997.

Cai, et al., "A Critical Analysis of the $\alpha$, $\beta$ and $\gamma$ Phases in Poly (Vinylidene Fluoride) Using FTIR," *RSC Advances*, 7;15382-15389, 2017.

Choi, et al., "Mechanical and Physical Properties of Epoxy Composites Reinforced by Vapor Grown Carbon Nanofibers," *Carbon*. 43; 2199-2208, 2005.

Corral-Flores &Bueno-Baques, "Flexible Ferroelectric BaTiO3—PVDF Nanocomposites" InTech Open Access Publisher, 347-362, 2011.

Dickens, et al., "Hysteresis Measurements of Remanent Polarization and Coercive Field in Polymers," *Journal of Applied Physics*, 72(9); 4258-4264, 1992.

Dong, et al., "Enhanced Dielectric and Piezoelectric Properties of x BaZrO3-(1-x) BaTiO3 Ceramics," *Journal of Applied Physics*, 111; 084107, 2012.

Ge, et al., "Active Origami by 4D Printing," *Smart Materials and Structures*, 23; 094007, 2014.

Ge, et al., "Multimaterial 4D Printing with Tailomble Shape Memory Polymers," *Scientific Reports*, 6, 31110; 1-10, 2016.

Granstrom, et al., "Energy Harvesting from a Backpack Instrumented with Piezoelectric Shoulder Straps," *Smart Materials and Structures*, 16; 1810-1820, 2007.

Gregorio Jr., & Cestari, "Effect of Crystallization Temperature on the Crystalline Phase Content and Morphology of Poly (Vinylidene Fluoride)," *Journal of Polymer Science Part B: Polymer Physics*, 32; 859-870, 1994.

Ince-Gunduz, et al., "Impact of Nanosilicates on Poly (Vinylidene Fluoride) Crystal Polymorphism: Part 1. Melt-Crystallization at High Supercooling," *Polymer*, 51; 1485-1493, 2010.

Jiang, et al. "Study of Thermally Poled and Corona Charged Poly (Vinylidene Fluoride) Films," *Polymer Engineering & Science*, 47(9); 1344-1350, 2007.

Kagan, et al., "Plastics Part Design: Low Cycle Fatigue Strength of Glass-Fiber-Reinforced Polyethylene Terephthalate (PET)," *Journal of Reinforced Plastics and Composites*, 23(15); 1607-1614, 2004.

Karaki, et al., "Lead-Free Piezoelectric Ceramics with Large Dielectric and Piezoelectric Constants Manufactured from BaTiO3 Nano-Powder," *Japanese Journal of Applied Physics*, 46(4); L97-L98, 2007.

Kawai, "The Piezoelectricity of Poly (Vinylidene Fluoride)," *Japanese Journal of Applied Physics*, 8(7); 975, 1969.

Kim, et al., "3D Optical Printing of Piezoelectric Nanoparticle-Polymer Composite Materials," *ACS Nano*, 8(10); 9799-9806, 2014.

Kim, et al., "Fabrication and Characterization of 3D Printed BaTiO3/PVDF Nanocomposites," *Journal of Composite Materials*, 52(2); 197-206, 2017.

Kim, et al., "Integrated 3D Printing and Corona Poling Process of PVDF Piezoelectric Films for Pressure Sensor Application," *Smart Materials and Structures*, 26; 1-9, 2017.

Lanceros-Mendez, S., et al., "FTIR and DSC Studies of Mechanically Deformed $\beta$-PVDF Films," *Journal of Macromolecular Science, Part B*, 40(3-4); 517-527, 2001.

Lee & Tarbutton, "Electric Poling-Assisted Additive Manufacturing Process for PVDF Polymer-Based Piezoelectric Device Applications," *Smart Materials and Structures*, 23(9); 095044, 1-7, 2014.

Mandal &Nandi, "Ionic Liquid Integrated Multiwalled Carbon Nanotube in a Poly (Vinylidene Fluoride) Matrix: Formation of a Piezoelectric $\beta$-Polymorph with Significant Reinforcement and Conductivity Improvement," *ACS Applied Materials & Interfaces*, 5(3); 747-760, 2013.

Mandal, et al., "The Electroactive $\beta$-Phase Formation in Poly (Vinylidene Fluoride) by Gold Nanoparticles Doping," *Materials Letters*, 73(15); 123-125, 2012.

Martins, et al.,, "Electroactive Phases of Poly (Vinylidene Fluoride): Determination, Processing and Applications," *Progress in Polymer Science*. 39(4); 683-706, 2014.

Matsushige, et al, "The II-I Crystal Transformation of Poly (Vinylidene Fluoride) Under Tensile and Compressional Stresses," *Polymer*, 21(12); 1391-1397, 1980.

Mendes, et al., "Effect of Filler Size and Concentration on the Structure and Properties of Poly (Vinylidene Fluoride)/BaTiO3 Nanocomposites," *Journal of Materials Science*. 47(3); 1378-1388, 2012.

Nagata & Kiyota, "Piezoelectric Properties of Low Coercive-Field BaTiO3 Ceramics and Its Application," *Japanese Journal of Applied Physics*, 28(S28-2); 98-100, 1989.

Nalwa, "Recent Developments in Ferroelectric Polymers," *Journal of Macromolecular Science, Part C: Polymer Reviews*,. 31(4); 341-432, 1991.

Park, et al., "Flexible Nanocomposite Generator Made of BaTiO3 Nanoparticles and Graphitic carbons," *Advanced Materials*, 24(22), 2999-3004, 2012.

Salimi & Yousefi, "Conformational Changes and Phase Transformation Mechanisms in PVDF Solution-Cast Films," *Journal of Polymer Science Part B: Polymer Physics*, 42(18): p. 3487-3495, 2004.

(56) References Cited

OTHER PUBLICATIONS

Sanchez & González-Benito, "PVDFBaTiO3/Carbon Nanotubes Ternary Nanocomposites: Effect of Nanofillers and Processing," *Polymer Composites*, 38(2); 227-235, 2017.

Sebastian & Jantunen, "Polymer-Ceramic Composites of 0-3 Connectivity for Circuits in Electronics: A Review," *International Journal of Applied Ceramic Technology*, 7(4); 415-434, 2010.

Seminara, et al., "Electromechanical Characterization of Piezoelectric PVDF Polymer Films for Tactile Sensors in Robotics Applications," *Sensors and Actuators A: Physical*, 169(1); 49-58, 2011.

Sencadas, et al., "α-to β Transformation on PVDF Films Obtained by Uniaxial Stretch," *Journal of Macromolecular Science, Part B*, 48(3); 514-525, 2006.

Sencadas, et al.,, "Processing and Characterization of a Novel Nonporous Poly (Vinilidene Fluoride) Films in the β Phase," *Journal of Non-Crystalline Solids*, 352; 2226-2229, 2006.

Shen, et al., "Mechanical Properties and Tensile Fatigue of Graphene Nanoplatelets Reinforced Polymer Nanocomposites," *Journal of Nanomaterials*, 1-9, 2013.

Shrout & Zhang, "Lead-Free Piezoelectric Ceramics: Alternatives for PZT?" *Journal of Electroceramics*, 19; 111-124, 2007.

Szabo, et al. "Elastomeric Composites with High Dielectric Constant for Use in Maxwell Stress Actuators," *Smart Structures and Materials in SPIE*, 5051; 180-190; 2003.

Takenaka, et al., (Bi1/2Na1/2) TiO3—BaTiO3 System for Lead-Free Piezoelectric Ceramics, *Japanese Journal of Applied Physics*, 30(9B); 2236-2239, 1991.

Yang, et al., "Synergetic Effects of Graphene Platelets and Carbon Nanotubes on the Mechanical and Thermal Properties of Epoxy Composites," *Carbon*. 49; 793-803, 2011.

Ye, et al., "Phase Transitions of Poly (Vinylidene Fluoride) Under Electric Fields," *Integrated Ferroelectrics*, 80; 245-251, 2006.

Zhou, et al., "Experimental Study on the Thermal and Mechanical Properties of Multi-Walled Carbon Nanotube-Reinforced Epoxy," *Materials Science and Engineering: A*, 452-453; 657-664, 2007.

Zhou, et al., "Fabrication and Characterization of Carbon/Epoxy Composites Mixed with Multi-Walled Carbon Nanotubes," *Materials Science and Engineering*: A. 475; 157-165, 2008.

\* cited by examiner

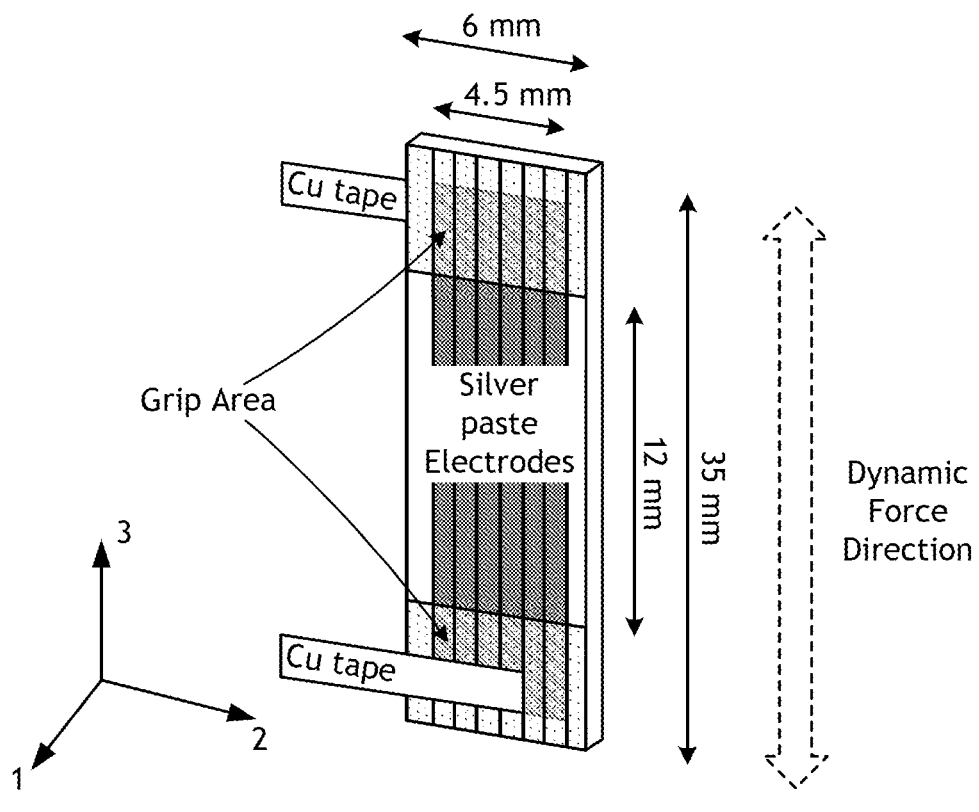
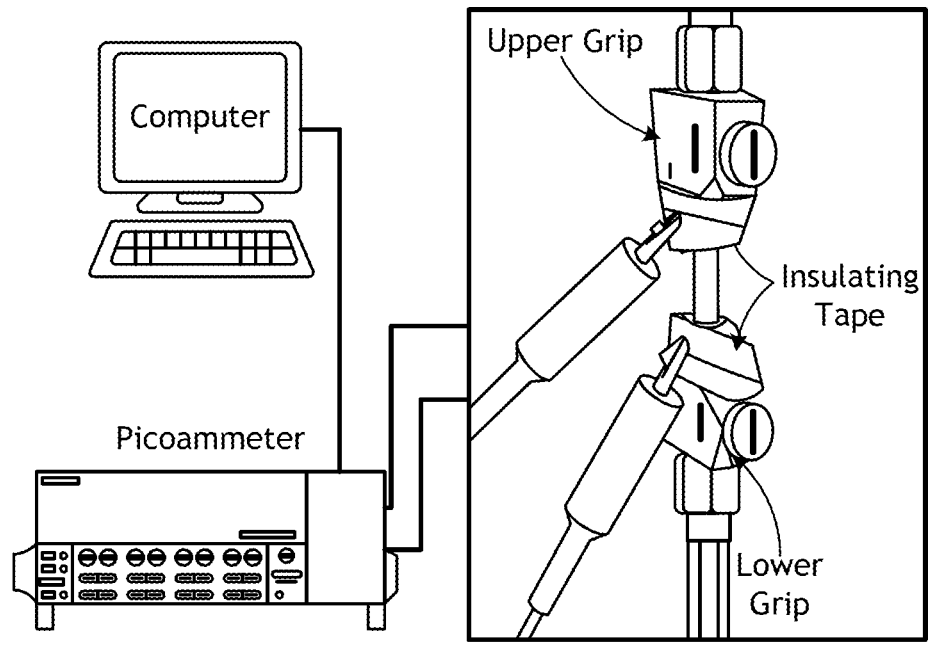
FIG. 13A (i and ii)

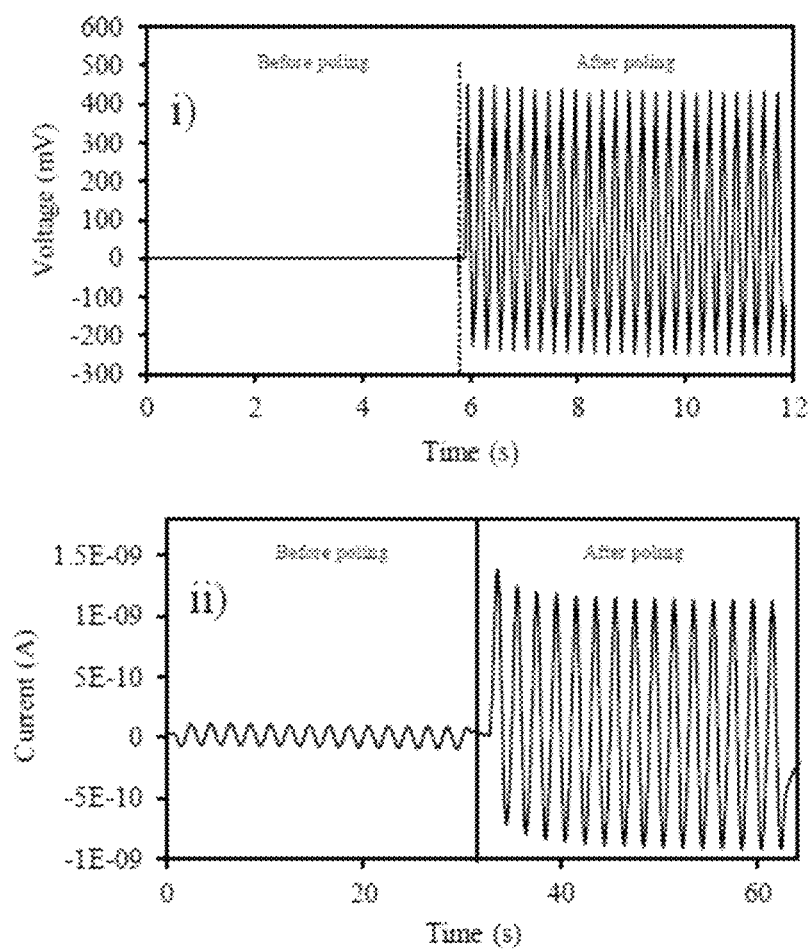
FIG. 13B (i and ii)

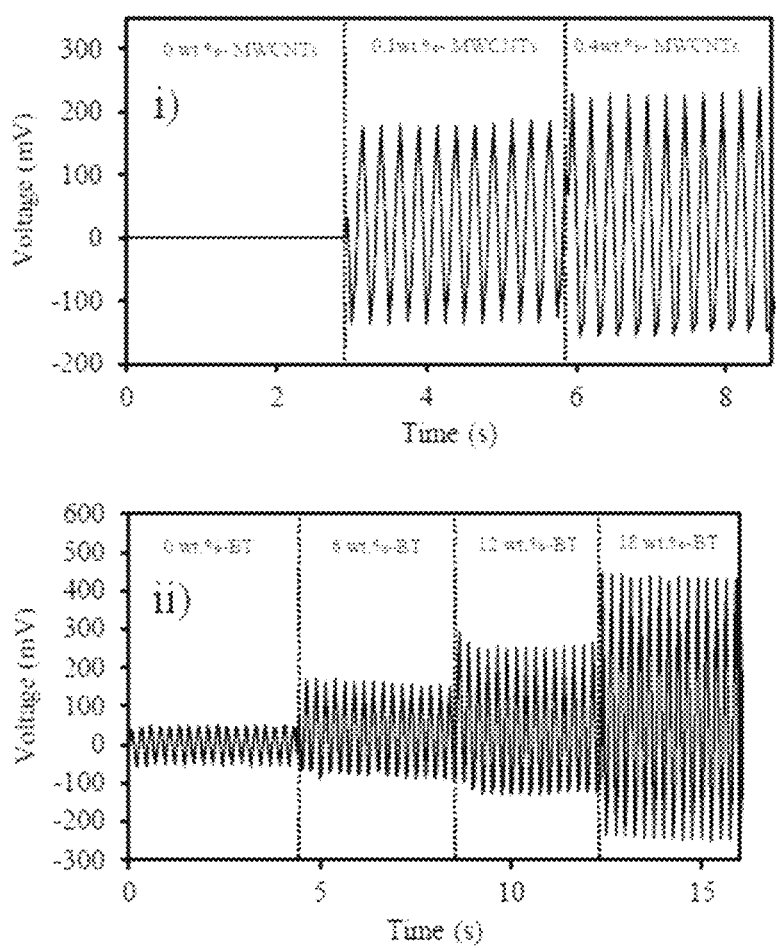
FIG. 13 C (i and ii)

3D PRINTING OF PIEZOELECTRIC CERAMIC PARTICLE/FLUOROPOLYMER NANOCOMPOSITES WITH IN-SITU POLING FOR SENSOR APPLICATIONS

CROSS REFERENCE TO RELATED APPLICATIONS

This application claims priority to U.S. Application No. 62/536,290 filed Jul. 24, 2017, which is incorporated herein by reference in its entirety.

STATEMENT REGARDING FEDERALLY FUNDED RESEARCH

This invention was made with government support under DMR-1205302 awarded by the NATIONAL SCIENCE FOUNDATION (NSF). The government of the United States of America has certain rights in the invention.

BACKGROUND OF THE INVENTION

A. Field of the Invention

The invention generally concerns a composition catalyst for three dimensional (3D) printing. In particular the composition includes a barium titanate (BTO)/fluoropolymer composite for printing piezoelectric devices.

B. Description of Related Art

The advancement of 3D printing technology has given rise to a novel field of study which has recently attracted a great deal of attention. This field of study focuses on the fabrication of programmable, functional material and is now commonly known as four dimensional (4D) printing technology [1]. By combining emerging 3D printing technology with composite materials, industries have the potential to implement novel fabrication processes along with enhanced materials to fabricate programmable devices in a cost-effective way [2]. One of the materials being used for sensors and energy harvesting is poly(vinylidene) fluoride (PVDF) polymer, which converts mechanical energy to electrical energy when subjected to an external force or vice versa [3].

PVDF polymer is a piezo- and pyro-electric material extensively studied for applications in sensor and energy harvesting areas. PVDF has the potential to be polarized through several conventional methods which require complicated and time-consuming procedures. Recently developed electric poling-assisted additive manufacturing (EPAM) process can print a piezoelectric layer by incorporating polarizing processes that include mechanical stretching, heat press, and electric field poling simultaneously. However, this process is limited to a single layer PVDF fabrication. In addition, quantitative material characterization such as piezoelectric coupling coefficient and 3 phase percentage has not been investigated.

Electric poling-assisted additive manufacturing (EPAM) is a recently developed 3D printing process that incorporates electric poling to allow simultaneous printing and poling [9]. The said process was reported on a recent study on a successful fabrication of a single layer, piezoelectric devices printed directly from pure PVDF polymer filament while applying a high electric field between nozzle tip and printing bed. This technique is a continuous fabrication process of PVDF held at high temperature during stretching and electric poling. It was demonstrated that ±1.5 nA output current can be generated from a single layer. However, quantitative material characterization in terms of 3-phase content and piezoelectric coupling coefficient $d_{31}/d_{33}$ have not been explored. In addition, qualitative measurement of PVDF output current was conducted by applying an external force through a bare hand, which is more of a qualitative assessment instead of quantitative measurement.

Piezoelectric ceramics such as lead zirconate-titanate (PZT), barium titanate (BTO), calcium-copper titanate $CaCu_3Ti_4O_{12}$ (CCTO), and bismuth sodium titanate (BNBT) have been utilized for their excellent dipole moment, high electromechanical coupling coefficient, and high dielectric constant in PVDF matrix to enhance the piezoelectric property [10-12]. Among these ceramics, BTO is preferred as inorganic filler due to its environmentally friendly nature and ease in handling as lead-free material [13]. However, piezoelectric ceramics require higher temperature for fabrication processing, and are brittle and difficult to use.

Therefore some researchers utilized graphitic carbon such as graphene oxide or multiwall carbon nanotubes (MWCNTs) to enhance both electric and stress transfer to the ceramic particles and uniform dispersion [5, 6]. In order to better enhance stress reinforcing, it is studied that a 3-trimethoxysilylpropyl methacrylate (TMSPM) linker molecular is covalently grafted on the BT particle surface. This surface modification of covalent bonding showed higher piezoelectricity than a graphitic carbon network [7]. In addition, there are several traditional methods for preparing BT/PVDF nanocomposites such as solvent-casting, spin-coating, and hot-embossing. Nonetheless, these methods entail complicated and time-consuming processes, quality issues, etc. [44].

SUMMARY OF THE INVENTION

Certain embodiments of the invention are directed to a print filament or print filament material. The print filament can be a composite of a piezoelectric ceramic particle (PCP)/fluoropolymer, and in certain aspects a carbon nanomaterial. The term "piezoelectric ceramic" means a material which produces an electrical voltage when subjected to strain caused by vibrations, acoustical energy, compression, tension, bending, multiaxial loading and the like. The PC material can include, but is not limited to lead zirconate-titanate (PZT), barium titanate (BTO), calcium-copper titanate $CaCu_3Ti_4O_{12}$ (CCTO), and bismuth sodium titanate (BNBT). A carbon nanomaterial can include, but is not limited to graphene, graphene oxide, carbon nanotubes (single or multi-walled (MWCNT)) and the like. The composite can have a PCP content of 0.01, 0.10, 1, 5, 10, 15, 20, 25, 30, 35, 40, 45, 50, 55, 60, 65, 70, 75, to 80 wt % (including all values and ranges there between) and a fluoropolymer content of 20, 25, 30, 35, 40, 45, 50, 55, 60, 65, 70, 75, 80, 85, 90, 95, 99, to 99.99 wt % fluoropolymer (including all values and ranges there between). In certain aspects the composite can have a PCP content of 40, 50, or 60 wt % (including all values and ranges there between) and a fluoropolymer content of 40, 50, or 60 wt % fluoropolymer (including all values and ranges there between). In certain aspects the composite can have a carbon nanomaterial content of 0.1 to 2 wt %. In particular aspects the carbon nanomaterial is single wall or multiwall carbon nanotubes (MWCNTs). In certain aspects the PCP is a BTO particle. In other aspects the fluoropolymer is PVDF.

Other embodiments are directed to methods of making a PCP/fluoropolymer or a MWCNT/PCP/fluoropolymer filament comprising: (a) mixing a PCP and fluoropolymer powder for uniform distribution of PCPs in a PCP/fluoropolymer composite; and (b) forming the PCP/fluoropolymer composite into a printing filament. The PCP and fluoropolymer powder can be mixed or processed via solvent-casting process. In certain aspects the methods further include mixing a carbon nanomaterial (e.g., MWCNT) prior to solvent casting. The method can further include (a) dissolving the fluoropolymer powder in an organic solvent (e.g., DMF, DMSO, and the like) at a weight ratio of 1:5 to 1:15, preferably 1:10, and adding the PCP powder and/or carbon nanomaterial to the fluoropolymer solution; (b) evaporating the organic solvent to form PCP/fluoropolymer or the carbon nanomaterial/PCP/fluoropolymer composites; and (c) extruding the PCP/fluoropolymer or the carbon nanomaterial/PCP/fluoropolymer composite to form a filament. In certain aspects the composite is extruded at a temperature of 100, 125, 150, 175, 200, 225, 250, 275, 300, 325, to 350° C. (including all values and ranges there between), preferably about 200° C. The filament can have a diameter of 0.5, 1, 2, 3 to 4, 5, 6 mm, including all values and ranges there between. The term "organic solvent" is used in its usual sense, that is to say that it refers to an organic compound capable of dissolving another compound (solute) to form a uniformly dispersed mixture at a molecular level. In the case that the solute is a fluoropolymer, it is common practice to refer to a solution of the fluoropolymer in a solvent when the resulting mixture is clear and no phase separation is visible in the system.

Certain embodiments are directed to a printing process that uses the compositions described herein in an EPAM printing procedure.

Embodiments of the invention are directed to FDM 3D printing of PCP/fluoropolymer or the carbon nanomaterial/PCP/fluoropolymer nanocomposite films, where PCP fillers and a fluoropolymer matrix are used as piezoelectric constituents and carbon nanomaterials as electrical and mechanical transfer network in the system for stress reinforcing, dispersant, and conducting function for nanoparticles.

The term fluoropolymer denotes any polymer that has in its chain at least one monomer chosen from compounds containing a vinyl group capable of opening in order to be polymerized and that contains, directly attached to this vinyl group, at least one fluorine atom, at least one fluoroalkyl group or at least one fluoroalkoxy group. Examples of fluoromonomers include, but are not limited to vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers, such as perfluoro(methyl vinyl) ether (PMVE), perfluoro(ethyl vinyl)ether (PEVE) and perfluoro(propyl vinyl)ether (PPVE); perfluoro(1,3-dioxole); and perfluoro(2,2-dimethyl-1,3-dioxole) (PDD). In certain aspects the fluoropolymers are the homopolymers and copolymers of vinyl fluoride and/or vinylidene fluoride. In a particular aspect the fluoropolymer is polyvinylidene fluride (PVDF).

The composition may contain other additives, such as, but not limited to impact modifiers, UV stabilizers, plasticizers, process aids, fillers, coloring agents, pigments, antioxidants, antistatic agents, surfactants, toner, pigments, and dispersing aids. UV absorbers can be present at 0 to 10 wt %, and preferably present at levels of from 0.5 to 7.0 wt %. In certain aspects a pigment can be added to a fluoropolymer composition. Pigments can be employed at levels from 0.5 to 50 wt %. In one embodiment, a fluoropolymer composition is made up of 20 to 99.99 wt % fluoropolymer.

Multiwalled carbon nanotube (MWCNT) refers to nanotubes having a layered structure, such as a fullerene-like structure, so that the nanotube comprises an outer region of multiple continuous layers of ordered atoms and an optional distinct inner core region or lumen. The layers are disposed substantially concentrically about the cylindrical axis of a fibril. The nanotube can be a solid, cylindrically shaped, and discrete fibril typically characterized by a substantially constant diameter of typically about 1 nm to about 100 nm, preferably about 2 nm to about 50 nm. In addition, the nanotube typically exhibits a length greater than about 10 times the diameter, preferably greater than about 100 times the diameter.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa.

The use of the word "a" or "an" when used in conjunction with the term "comprising" in the claims and/or the specification may mean "one," but it is also consistent with the meaning of "one or more," "at least one," and "one or more than one."

The term "about" or "approximately" are defined as being close to as understood by one of ordinary skill in the art. In one non-limiting embodiment the terms are defined to be within 10%, preferably within 5%, more preferably within 1%, and most preferably within 0.5%.

The term "substantially" and its variations are defined to include ranges within 10%, within 5%, within 1%, or within 0.5%.

The terms "wt. %," "vol. %," or "mol. %" refers to a weight, volume, or molar percentage of a component, respectively, based on the total weight, the total volume, or the total moles of material that includes the component.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods of making and using the same of the present invention can "comprise," "consist essentially of," or "consist of" particular ingredients, components, blends, method steps, etc., disclosed throughout the specification.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIGS. 13A-13D. (A) schematic illustration of (i) sample design and (ii) experimental setup for piezoelectric output measurement, (B) the measured (i) voltage and (ii) current output results generated by 0.4 wt. %-MWCNT/18 wt. %-BT/PVDF under 40 N before and after electric poling, (C) voltage output results generated by (i) various MWCNTs content of 12 wt. %-BT/PVDF and (ii) various BT particle contents of 0.4 wt. %-MWCNT under 40 N, and (D) voltage output results generated by 0.4 wt. %-MWCNT/18 wt. %-BT/PVDF under various forces (10, 20, 30, 40, 60, and 80 N).

DETAILED DESCRIPTION OF THE INVENTION

Figure 1:
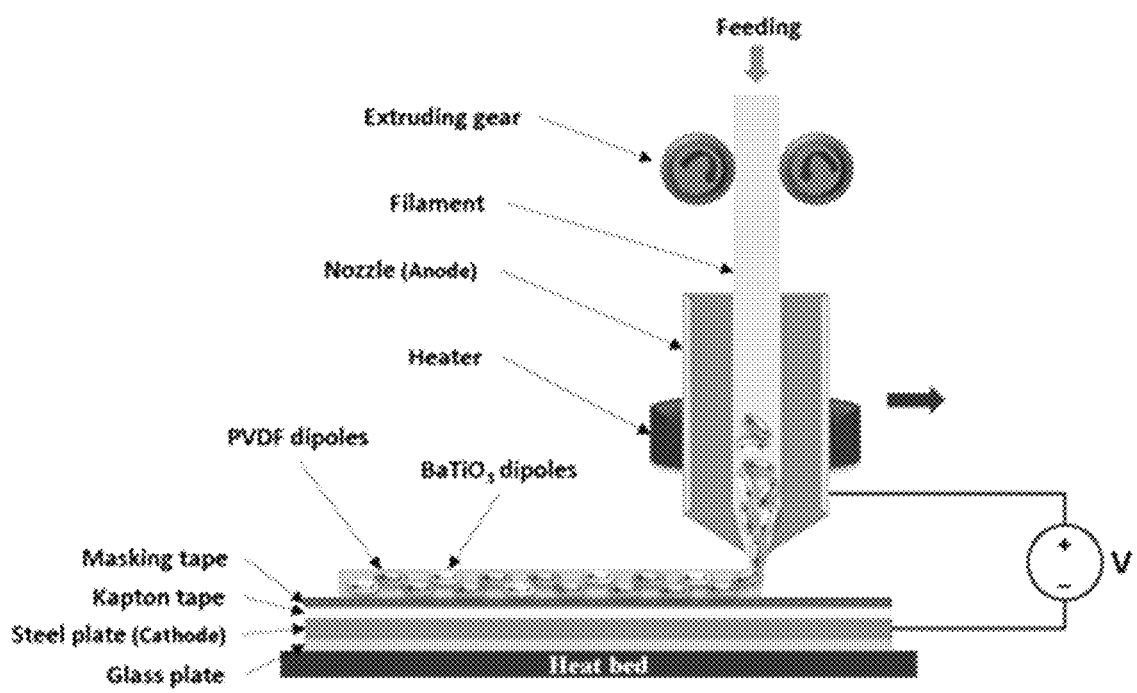
FIG. 1. Schematic of in-situ 3D printing and dipole alignment of PVDF and BTO NPs.

Embodiments of the invention are directed to methods, devices, and compositions for 3D printing of piezoelectric devices. The piezoelectric devices can be used for sensor applications using poly(vinylidene) fluoride (PVDF) and BaTiO$_3$ (BTO) nanocomposites through in-situ electric poling 3D printing process. Described herein is an enhanced EPAM process to apply higher electric field during 3D printing. To further increase piezoelectric response, PCP was used as fillers in fluoropolymer matrix to further enhance the piezoelectric coupling coefficient. Solvent-casting was processed to uniformly mix PVDF with BTO NPs as filament precursor for fused deposition modeling (FDM) 3D printing. Then a filament extruder was used to fabricate the filament, which is then loaded in an FDM 3D printer for sensor fabrication. It was found that a 55.91% PVDF 3-phase content was nucleated at 15 wt % of BTO. The output current and 3-phase content gradually increased as the BTO weight percent increase. Scanning Electron Microscopy (SEM) analysis demonstrated that larger agglomerates were formulated with the increase of BTO NPs contents and resulted in increased toughness and decreased tensile strength. In addition, the highest fatigue strength was seen at 3 wt. % BTO and it gradually decreased as the NPs contents increased due to defect propagation, poor load transmission, stress accumulation from agglomerates and aggregated NPs during fatigue life measurement.

Certain aspects of the invention can also include a printing filament including a poly(vinylidene) fluoride (PVDF), BaTiO$_3$ (BT), and multiwall carbon nanotubes (MWCNTs) composite (PVDF/BTO/MWCNT). The PVDF/BTO/MWCNT can be used to form piexoelectric sensor. The piezoelectric sensor can be formed using the fused deposition modeling (FDM) 3D printing techniques.

Compositions of the invention comprise barium titanate (BTO) particles as an example of a PCP. PCP particles can be "uncoated" particles, that is PCP particles specifically lacking hydrophobic modification, polymer encapsulation, surfactant modification, and the like. In some embodiments, the uncoated PCPs are present in composite described herein in a range of from about 0.25 to about 15, from about 0.5 to about 13, or from about 1 to about 10 weight percent of the total weight of the composite materials. In some aspects the PCPs have an average particle size in a range of from about 0.2 microns to about 1.5 microns, or from about 0.4 to about 0.8 microns, or from about 0.5 to about 0.7 microns, including any values between the recited ranges.

Some suitable piezoelectric ceramics for use in accordance with the present invention include AgNbO$_3$, AgTaO$_3$, AlN, BaTiO$_3$, (Ba,Ca)TiO$_3$, Ba$_4$Na$_2$NbO$_3$, BaNb$_2$O$_6$, (Ba,Pb)TiO$_3$, (Ba,Sr)Nb$_2$O$_6$, (Ba,Sr)TiO$_3$, Ba(Ti,Zr)O$_3$, $(Ba_{0.777}Ca_{0.133}Pb_{0.090})TiO_3$, BeO, $Bi_3TiNbO_9$, $Bi_3TiTaO_9$, $Bi_4Ti_3O_{12}$, $Bi_5Ti_3GaO_{15}$, $Bi_5Ti_3FeO_{15}$, $Bi_2PbNb_2O_9$, $Bi_2PbTa_2O_9$, $Bi_3PbTi_2NbO_{12}$, $Bi_4PbTiO_{15}$, $Bi_4Pb_2Ti_5O_{18}$, $Bi_2CaNb_2O_9$, $Bi_2CaTa_2O_9$, $Bi_4CaTi_4O_{15}$, $Bi_2SrNb_2O_9$, $Bi_2SrTa_2O_9$, $Bi_4SrTiO_{15}$, $Bi_4Sr_2Ti_5O_{18}$, $Bi_2BaNb_2O_9$, $Bi_2BaTa_2O_9$, $Bi_3BaTi_2NbO_{12}$, $Bi,BaTiO_{15}$, $Bi_4Ba_2Ti_5O_{18}$, $Bi_{4.5}Na_{0.5}Ti_4O_{15}$, $Bi(Na,K)Ti_2O_6$, $Bi_{4.5}K_{0.5}Ti_4O_{15}$, $BiFeO_3$, $Bi_{12}GeO_{20}$, CdS, CdSe, CdTe, $C_2H_4(NH_3)_2(C_4H_4O_6)$, $(CH_2CF)_n$, $C_6H_{14}N_2O_6$, $Cd_2Nb_2O_7$, CuCl, GaAs, $K_2C_4H_4O_{6-0.5}H_2O$, $KH_2PO_4$, $(K,Na)NbO_3$, $KNbO_3$, $K(Nb,Ta)O_3$, $LiGaO_2$, $LiNbO_3$, $LiTaO_3$, $LiIO_3$, $(Na_{0.5}K_{0.5})NbO_3$, (hot pressed), (Na,Ca)(Mg,Fe,Al,Li), $3Al_{6-}(BO_3)_3(Si_6O_{18})(OH,F)_4$, $(Na,Cd)NbO_3$, $NaNbO_3$, $Na(Nb,Ta)O_3$, $(Na,Pb)NbO_3$, $Na_{0.5}Bi_{4.5}TiO_{15}$, $NaKC_4H_4O_{6-4}H_2O$, $NH_4H_2PO_4$, $ND_4D_2PO_4$, $Pb_{0.925}La_{0.05}Zr_{0.56}Ti_{0.44}O_3$, $(Pb_{0.58}Ba_{0.42})Nb_2O_6$, $(Pb,Ba)(Ti,Sn)O_3$, $(Pb,Ba)(Ti,Zr)O_3$, $(Pb_{0.76}Ca_{0.24})[Co\frac{1}{2}W\frac{1}{2})_{0.04}Ti_{0.96}]O_3$+2 mol % MnO, $PbHfO_3$, $_{0.65}Pb(Mg\frac{1}{3}Nb\frac{2}{3})O_{3-31}$ $_{0.35}PbTiO_3$, $PbNb_2O_6$, $Pb(Nb,Ta)_2O_6$, $PbSnO_3$, $(Pb,Sr)Nb_2O_6$, $(Pb,Sr)(Ti,Zr)O_3$, $PbTiO_3$, $PbTiO_3BiFeO_3$, $PbTiO_3$, $Pb(Fe_{0.5}Nb_{0.5})O_3$, $PbTiO_3,Pb(Mg\frac{1}{3}Nb\frac{2}{3})O_3$, $PbTiO_3Pb(Zn\frac{1}{3}Nb\frac{2}{3})O_3$, $Pb(Ti,Sn)O_3$, $Pb(Ti,Zr)O_3$, $Pb(Ti,Zr)O_3$—$Pb(Fe_{0.5}Nb_{0.5})O_3$, $Pb(Ti,Zr)O_3$, $Pb(Mg\frac{1}{3}Nb\frac{2}{3})O_3$, $Pb(Ti,Zr)O_3Pb(Ni\frac{1}{3}Nb\frac{2}{3})O_3$, $Pb(Ti,Zr)O_3$, $Pb(Ti,Zr,Sn)O_3$, $PbZrO_3$, $PbZrO_3$, $BaZrO_3$, $Pb(Zr,Sn,Ti)O_3$, g-Se, a-$SiO_2$, $SrBi_4TiO_{15}$, $Sr_2Ta_2O_7$, $SrTiO_3$, $WO_3$, ZnO, b-ZnS, ZnSe, ZnTc.

One group of piezoelectric ceramics suitable for use in accordance with the present invention includes oxides of metals selected from Ba, Sr, Ca, Pb, Ti, Zr, Mg, La and/or Nb. For example, the piezoelectric ceramics may comprise $Pb(Mg\frac{1}{3}Nb\frac{2}{3})O$, (PMN) or metal titanates such as $BaTiO_3$, $PbTiO_3$, $Pb(Ti,Zr)O_3$ (PZT) and/or $Pb(La,Ti,Zr)O_3$ (PLZT), with $BaTiO_3$ and $PbTiO_3$, being particularly suitable piezoelectric ceramics. Metal oxides such as ZnO and $SiO_2$ may also be suitable.

The piezoelectric ceramic is provided in the form of particulates or nanoparticles which may have any desired shape such as equiaxed, elongated, plate, rod, fiber, ellipsoidal, spherical, spheroidal and disc-shaped particulates. The particles are preferably discontinuous and are dispersed in the fluoropolymer matrix.

The term fluoropolymer denotes any polymer (e.g., PVDF) that has in its chain at least one monomer chosen from compounds containing a vinyl group capable of opening in order to be polymerized and that contains, directly attached to this vinyl group, at least one fluorine atom, at least one fluoroalkyl group or at least one fluoroalkoxy group. Examples of fluoromonomers include, but are not limited to vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers, such as perfluoro(methyl vinyl)ether (PMVE), perfluoro(ethyl vinyl)ether (PEVE) and perfluoro(propyl vinyl)ether (PPVE); perfluoro (1,3-dioxole); perfluoro(2,2-dimethyl-1,3-dioxole) (PDD). Preferred fluoropolymers are the homopolymers and copolymers of vinyl fluoride and/or vinylidene fluoride.

PVDF is a semi-crystalline polymer that consists of long molecular chain with repeated unit —[$CF_2$—$CH_2$]— which has a large dipole moment of $7.58 \times 10^{-28}$ C·cm [4]. It exhibits a polymorphism based on crystal orientations: α, β, γ, and δ phases 3-phase has attracted a great deal of attention for having the largest dipole moment among the possible phase. A typical process to transform PVDF from its natural α- to β-phases is by axially stretching the polymer by a factor of 4:1 followed by the application of a high electric field to align the dipole structures [3, 5, 6]. For these properties, PVDF is among the most desirable polymer for sensor and actuator applications due to its highest remnant polarization [7, 8]. In addition, this polymer has excellent thermal and mechanical properties, making it an ideal material for 4D printing due to its thermoplastic and programmable piezoelectric behavior.

An organic solvent as used herein can include, but is not limited (i) aliphatic hydrocarbons including the paraffins such as pentane, hexane, heptane, octane, nonane, decane, undecane, dodecane or cyclohexane, and naphthalene and aromatic hydrocarbons such as benzene, toluene, xylenes, cumene, petroleum fractions composed of a mixture of alkylbenzenes, (ii) aliphatic or aromatic halogenated hydrocarbons including perchlorinated hydrocarbons such as tetrachloroethylene, hexachloroethane; partially chlorinated hydrocarbons such as dichloromethane, chloroform, 1,2-dichloroethane, 1,1,1-trichloroethane, 1,1,2,2-tetrachloroethane, pentachloroethane, trichloroethylene, 1-chlorobutane, 1,2-dichlorobutane, monochlorobenzene, 1,2-dichlorobenzene, 1,3-dichlorobenzene, 1,4-dichlorobenzene, 1,2,4-trichlorobenzene or mixture of different chlorobenzenes, (iii) aliphatic, cycloaliphatic or aromatic ether oxides such as diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF), (iv) glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, (v) glycol ether esters such as ethylene glycol methyl ether acetate, ethylene glycol monoethyl ether acetate, ethylene glycol monobutyl ether acetate, (vi) alcohols such as methyl alcohol, ethyl alcohol, diacetone alcohol, (vii) ketones such as acetone, methylethylketone, methylisobutyl ketone, diisobutylketone, cyclohexanone, isophorone, (viii) linear or cyclic esters such as methyl acetoacetate, dimethyl phthalate, γ-butyrolactone, (ix) linear or cyclic carboxamides such as N,N-dimethylacetamide (DMAC), N,N-diethylacetamide, dimethylformamide (DMF), diethylformamide or N-methyl-2-pyrrolidone (NMP), or (x) organic carbonates for example dimethyl carbonate, diethyl carbonate, dipropyl carbonate, dibutyl carbonate, ethylmethyl carbonate, ethylene carbonate, vinylene carbonate.

A. PCP/Fluoropolymer Composites

Embodiments of the invention are directed to the fabrication of nanocomposite material PCP/fluoropolymer, where PCPs were used as fillers in a fluoropolymer matrix to enhance piezoelectric response. Different weight contents of BTO particles ranging from 1 wt %-15 wt % were used and the piezoelectric response as a function of weight percentage of BTO particles were characterized. EPAM process was modified to increase maximum capacity of electric field for better polarization with number of layers while conducting in-situ poling of BTO/PVDF nanocomposites. In addition, mechanical properties of printed materials were tested to analyze the effects of BTO on PVDF. The process will enable the low-cost mass production of nanocomposite piezoelectric devices to be used in sensor industry [14].

EPAM combines FDM 3D printing with electric poling process to fabricate free-form single structure while maintaining uniform alignment of dipole in the PVDF polymer

[9]. This process includes effective poling factors such as shear force, heat, and electric field for polarization. However, this process is limited by electrical hazards when undergoing the poling process. It was found that applying more than 2 MV/m may cause electric breakdown which emits a transient electromagnetic disturbance that causes the printer to lose communication with the computer. The other limitation found in the previous study was that EPAM is limited to fabricate only one single layer for piezoelectric device. Therefore, EPAM process was modified to enable to apply higher electric field and print multiple layers. FDM machine (Lulzbot TAZ 5) was modified and detailed modifications are described as follow:

Modification of hardware setup: Cathode electrode placed at the heating bed was switched by adding a glass and steel plate on top of the heating bed to prevent electric shock on 3D printer as shown in FIG. 1. The electrical breakdown often occurs because Kapton tape tends to be easily burned when hot nozzle tip is close and molten material is deposited onto Kapton tape. Due to this reason, masking tape is laid over the Kapton tape to prevent electric breakdown and to help deposited material to adhere firmly onto the bed as shown in FIG. 1. Therefore, high electric field can be applied up to 40 MV/m without electrical breakdown as well as preventing high electrical shock inside 3D printer. 40 MV/m is enough electric field larger than coercive field (0.5-1.6 MV/m) of BTO nanoparticles [15, 16] and close to coercive field (50 MV/m) of PVDF [17].

Figure 2A:
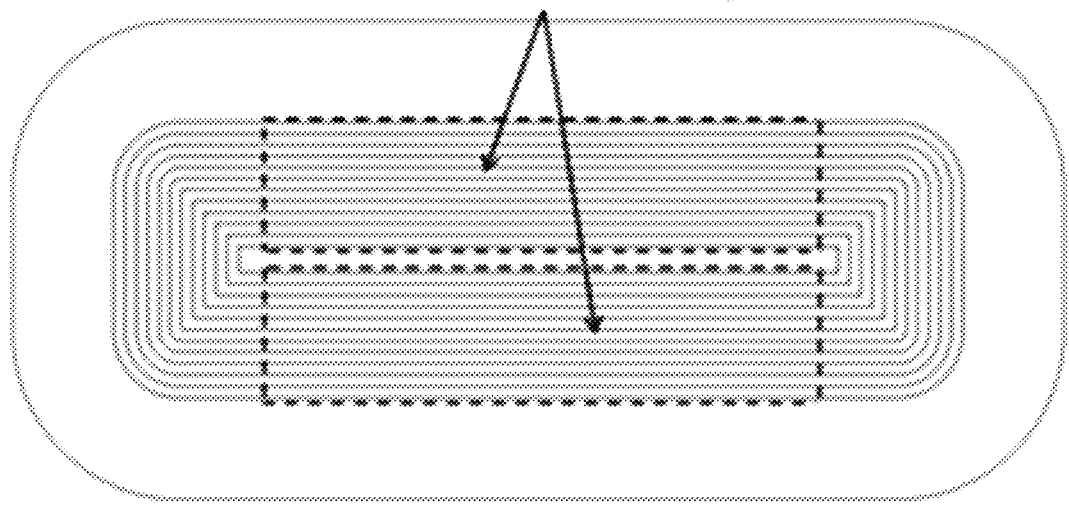
FIGS. 2A-2C. (A) A captured image of concentric fill pattern design created in SLIS3R™ software, (B) 3D printed BTO/PVDF films and (C) schematic of dipole alignment of PVDF AND BTO NPS fabricated by modified EPAM process.
Figure 2B:
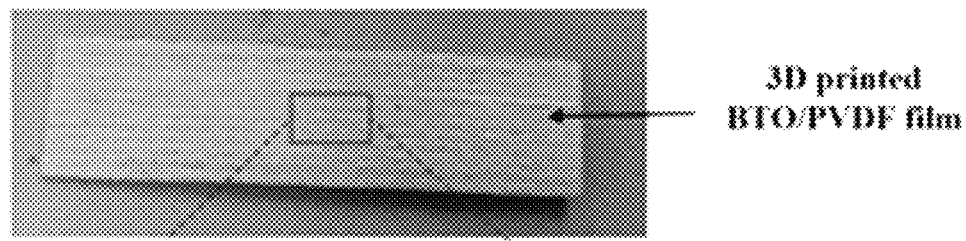
Figure 2C:
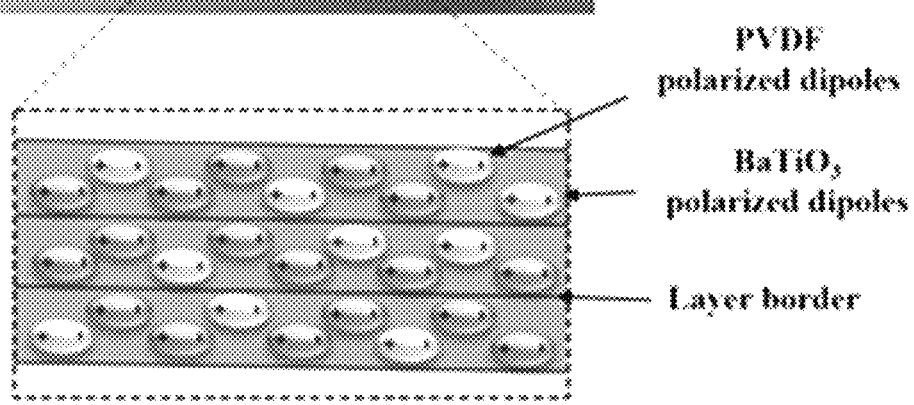

Design of 3D model for piezoelectric device: General printing layer pattern such as zigzag will decrease the piezoelectric coupling coefficient since each layer side by side can significantly cancel electric charges of aligned dipoles. Therefore, in order to have all dipoles in each layers be aligned to the same direction, a concentric fill pattern was set up using Slic3r software which is a tool that converts digital 3D models into printing instruction and customize printing parameters such as tool path, fill pattern, etc. as shown in FIG. 2.

Fabrication of BTO/PVDF Nanocomposites Film
Materials.

Commercial PVDF powder (Mw-534,000; Sigma-Aldrich) and BTO powder (700 nm; Inframat®) were used as the main components to prepare the nanocomposite filament. N-Dimethylformamide (DMF, OmniSolv®) was used as the solvent material to dissolve PVDF and BTO.

Filament Fabrication.

The BTO and PVDF powder were mixed via solvent-casting process which is an alternative method of physical mixing for uniform distribution of BTO NPs. Solution was prepared by dissolving PVDF powder in DMF solvent (1:10 weight ratio). Solution was then placed in a water bath at 80° C. and was stirred using a magnetic stir bar at 300 rpm for approximately 30 minutes. After PVDF powder fully dissolved, BTO powder was introduced to solution. This attained nanocomposites solution was then heated and stirred using the same parameters for approximately 15 minutes. BTO built up at the bottom of solution was addressed by ultra-sonication (Branson Sonifier 450) for 20 minutes. DMF solvent is then evaporated by dispersing nanocomposites solution onto a glass substrate and heated to a temperature of 80° C. for 12 hrs. The procedure yields a thin sheet of BTO/PVDF nanocomposites, these casted nanocomposites were sliced down to be easily extruded by filament extruder machine (Filabot). Diameter of extruded filament and extruding temperature are 2.89 mm and 195° C. respectively.

Modified EPAM Process

Modified EPAM process enables infinite number of layers in X and Y axes meaning that large area of piezoelectric film can be fabricated under higher electric field. For the cyclic load frame test, eight layers were printed under 40 MV/m with varying concentration of BTO powders: 0, 3, 6, 9, 12, and 15 wt. %. Increasing the weight content above 15%—BTO would increase severe clogging within the nozzle which could potentially damage the 3D printer. Other printing process parameters were unchanged with respect to previous research and are described in table 1. Final film was 0.33 mm in thickness with dimensions of 7.5×40 mm.

TABLE 1

Experimental conditions of the modified EPAM process

| Process parameters | Conditions |
| --- | --- |
| Nozzle temp. (° C.) | 230 |
| Heating bed temp. (° C.) | 100 |
| Extrusion speed (mm/s) | 3 |
| Electric field (MV/m) | 40 |
| Materials ($BaTiO_3$ wt. %) | 0, 3, 6, 9, 12, 15 |

Instrumentation and Characterization

Figure 3A:
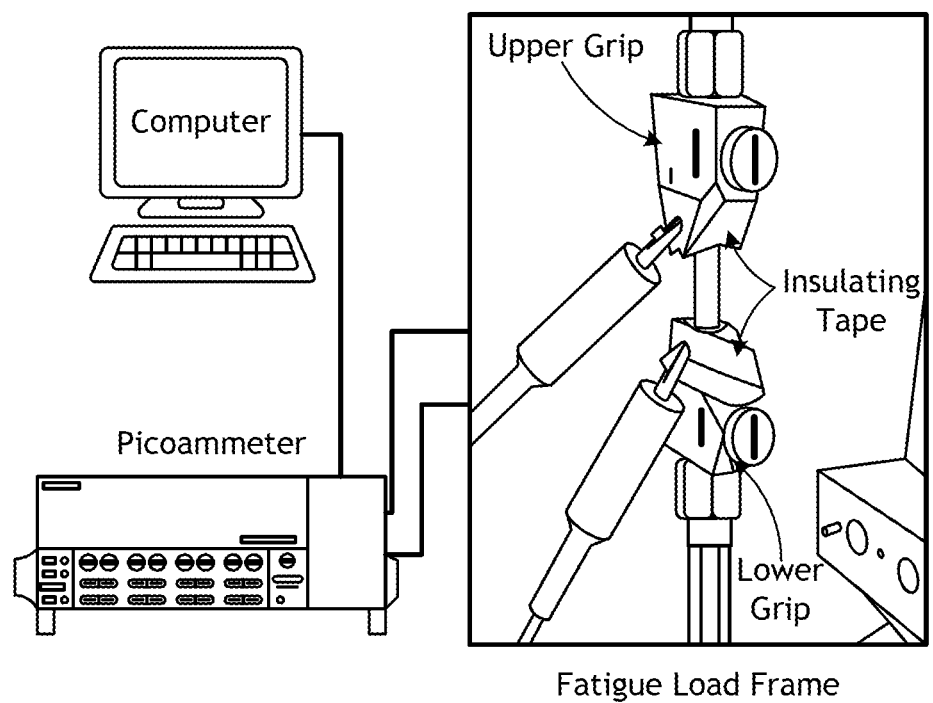
FIGS. 3A-3B. Schematic of (A) the experimental setup for piezoelectric output current measurement and (b) sample and electrode design for piezoelectric property, fatigue, and tensile tests.
Figure 3B:
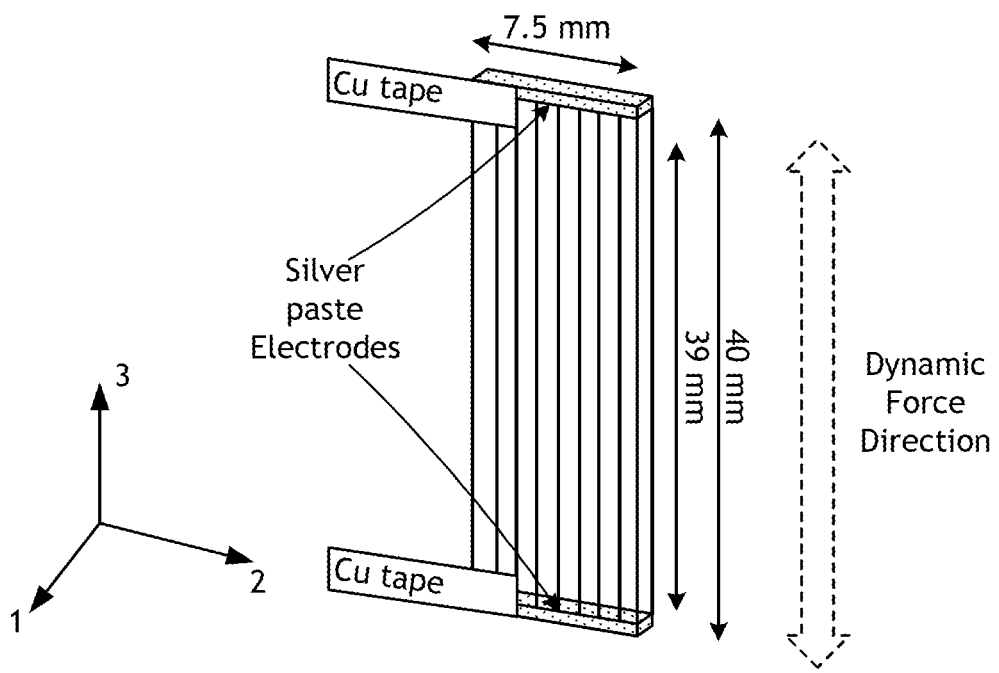

The morphology of 3D printed nanocomposites films was observed using a scanning electron microscopy (SEM, TM-1000, Hitachi). A Fourier transform infrared spectroscopy (FTIR, Agilent Technologies Cary 630 ATR-IR) analysis was performed in the 600-1600 $cm^{-1}$ wavenumber range at room temperature in order to characterize an infrared spectrum of absorption of 3D printed nanocomposites films. For piezoelectric property analysis, piezoelectric output current was measured by fatigue load frame (Bose Electro-Force-BioDynamic, TA Instruments) and picoammeter (Keithley 6485) as shown in FIG. 3A. To quantify the piezoelectric property of 3D printed film, samples were prepared with silver conductive paint electrodes in both cross-sectional surfaces. The electrodes were then extended with Cu tape to allow a proper connection to the picoammeter as shown in FIG. 3B. Cyclic force was applied on BTO/PVDF film to measure periodic output current, the fatigue load frame generated 50 cyclic loads on the sample under a range from 5 to 45 N at 1 Hz while the picoammeter measured the current output [18]. To prevent noise from fatigue machine during measurement, two grips handing the sample were covered with electrical insulating tape.

Mechanical Property Analysis

Tensile and fatigue testings were performed by eXpert 5600 series (ADMET MTESTQuattro) and Bose Electro-Force-BioDynamic (TA Instruments), respectively. The tensile test were conducted at the speed of 5 mm/min [19]. Fatigue test was conducted in tension-tension cyclic mode at frequency f=3 Hz which is appropriate for the thermal effect and ratio of the minimum to maximum stress in cycle is 0.1 ($R=S_{min}/S_{max}$) [20]. All samples were subjected to cyclic loading until the final fracture during fatigue life measurement. The sample's dimension was same as the sample for fatigue load frame test as shown in FIG. 3B and was tested at 95%-75% of their static tensile strength under room temperature.

Scanning Electron Microscopy (SEM) Analysis

Figures 4A, 4B, 4C, 4D, 4E, 4F:
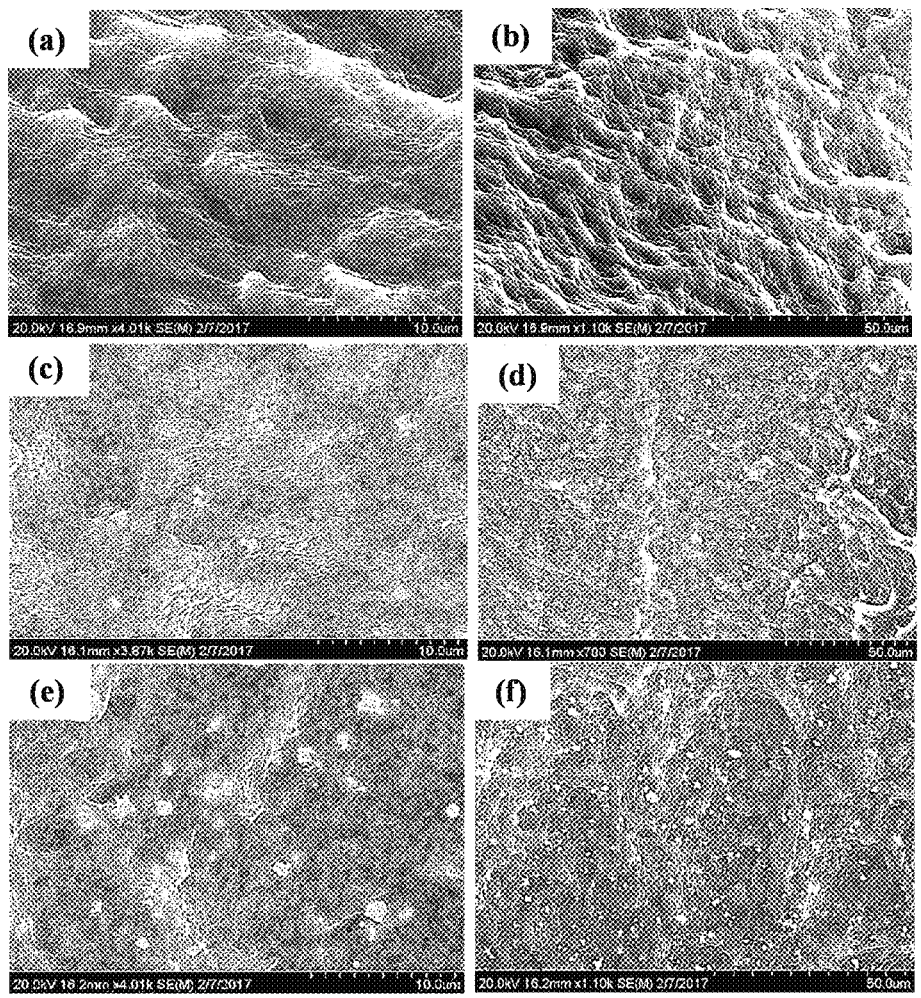
FIGS. 4A-4L. SEM images of the surfaces of 3D printed nanocomposites films with compositions of (A-B) PVDF, (C-D) 3 wt. %-BTO/PVDF, (E-F) 6 wt. %-BTO/PVDF, (G-H) 9 wt. %-BTO/PVDF, (I-J) 12 wt. %-BTO/PVDF, (K-L) 15 wt. %-BTO/PVDF.
Figures 4G, 4H, 4I, 4J, 4K, 4L:
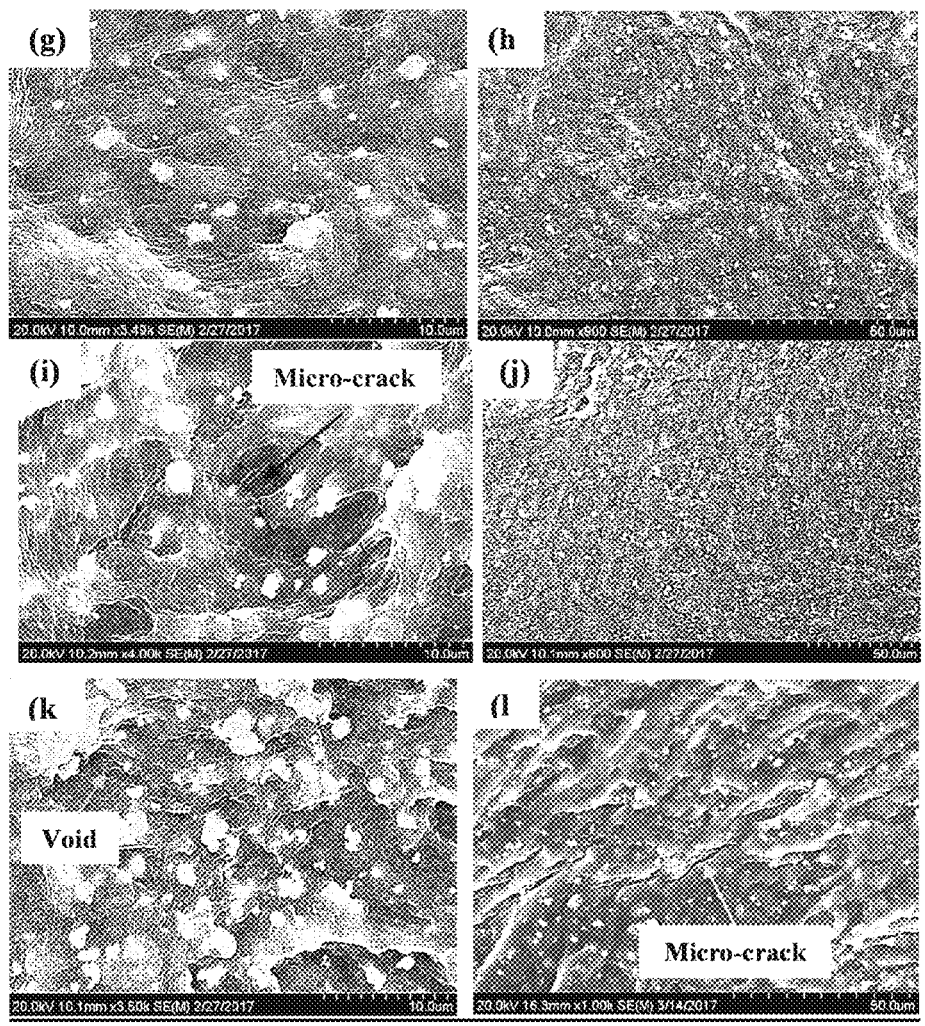

The surface topography of 3D printed nanocomposites films with different BTO NPs contents was comparatively examined by SEM analysis. As shown in FIG. 4A-4B, pure PVDF exhibited relatively no BTO NPs in matrix and higher amount of BTO NPs were seen as NPs contents increase. As BTO NPs contents increase, amount of NPs agglomerates and their sizes were observed to increase relatively in PVDF matrix as shown in FIGS. 4C-4L and it was also observed that voids were created in the matrix and their sizes were increased relatively. In addition, micro-cracks in matrix were observed at 9 wt. %-BTO as shown in FIG. 4I and relatively bigger cracks were observed at 15 wt. %-BTO as shown in FIG. 4L.

Fourier Transform Infrared Spectroscopy (FTIR) Analysis

The most electroactive phase of PVDF is β-phase among other crystalline phases (α, β, γ, δ) [21-23]. This β-phase can be nucleated by the presence of BTO inclusion [24]. In order to quantify the β-phase content change of 3D printed BTO/PVDF film, FTIR analysis was performed following α-phase bands at 614, 766, 795, 855, and 976 cm$^{-1}$ and (β-phases absorption bands, at 840, 884, and 1279 cm$^{-1}$ [25]. β- and γ-phases resemble each other structurally and spectroscopically at 510, 840, and 884 cm$^{-1}$ [26], which makes the differentiation more difficult. In addition, only β-phase (all-trans (TTT) conformation) has a strong piezoelectric response because of its largest spontaneous polarization (7×10$^{-30}$ Cm per unit cell), therefore, only β-phase was considered when analyzing IR absorption bands [26-28].

The β-phase contents of each sample were calculated, specifically, at the absorption bands of 764 and 840 cm$^{-1}$ which are characteristics of α- and β-phases respectively. Assuming that the infrared absorption follows the Lambert-Beer law, $A_\alpha$ and $A_\beta$ absorbance at 764 and 840 cm$^{-1}$, respectively, are given by Eq. (1) below [29]:

$$A_{\alpha,\beta} = \log\left(\frac{I^0_{\alpha,\beta}}{I_{\alpha,\beta}}\right) = C \cdot K_{\alpha,\beta} \cdot X_{\alpha,\beta} \cdot L \quad (1)$$

where the subscripts α and β are defined as the crystalline phases, $I^0$ and I are the incident and transmitted intensities of the radiation, respectively. The L is defined as a sample thickness, C is an average monomer concentration, K is the absorption coefficient at the respective wave number, and X is the degree of crystallinity of each phase [29]. For a system containing α- and β-phases, the relative fraction of the (β-phase, F(β), can be calculated using Eq. (2) [29]:

$$F(\beta) = \frac{X_\beta}{X_\alpha + X_\beta} = \frac{A_\beta}{(K_\beta/K_\alpha)A_\alpha + A_\beta} = \frac{A_\beta}{1.26A_\alpha + A_\beta} \quad (2)$$

where $K_\alpha$ (6.1×10$^4$ cm$^2$/mol) and $K_\beta$ (7.7×10$^4$ cm$^2$/mol) are the absorption coefficients at the respective wave number.

Figure 5:
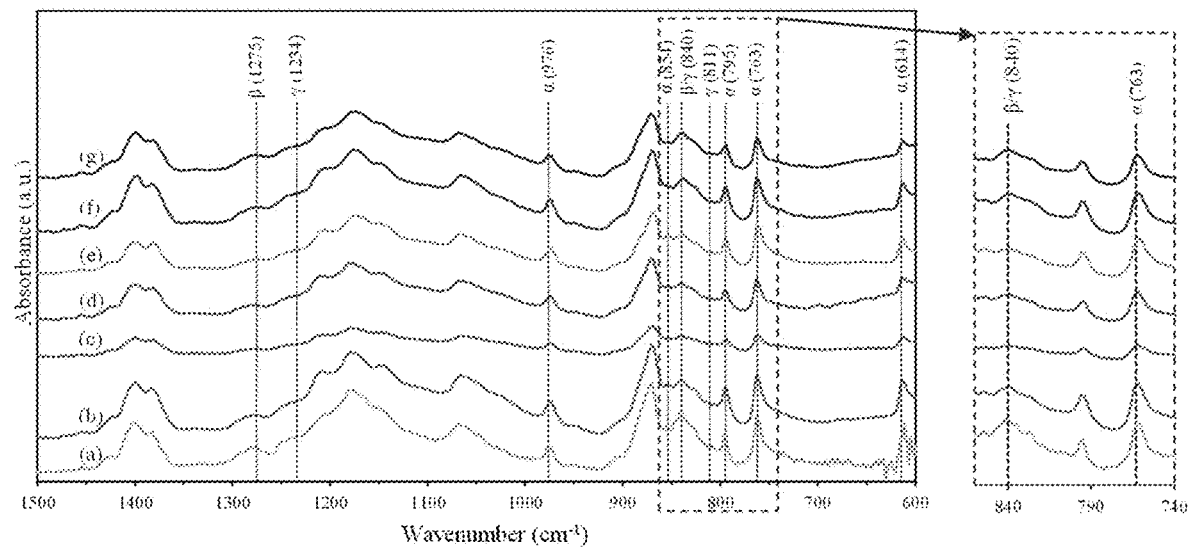
FIG. 5. FTIR spectra for (A) non poled 3D printed PVDF and poled 3D printed: (B) PVDF, (C) 3 wt. %-BTO/PVDF, (D) 6 wt. %-BTO/PVDF, (E) 9 wt. %-BTO/PVDF, (F) 12 wt. %-BTO/PVDF, (G) 15 wt. %-BTO/PVDF.

The comparison of FTIR spectra with respect to different BTO NPs contents is shown in FIG. 5. The β-phase at 840 cm$^{-1}$ band was simultaneously increasing as relative to α-phase at 766 cm$^{-1}$ band in accordance to the linear increase of BTO NPs contents.

Figure 6:
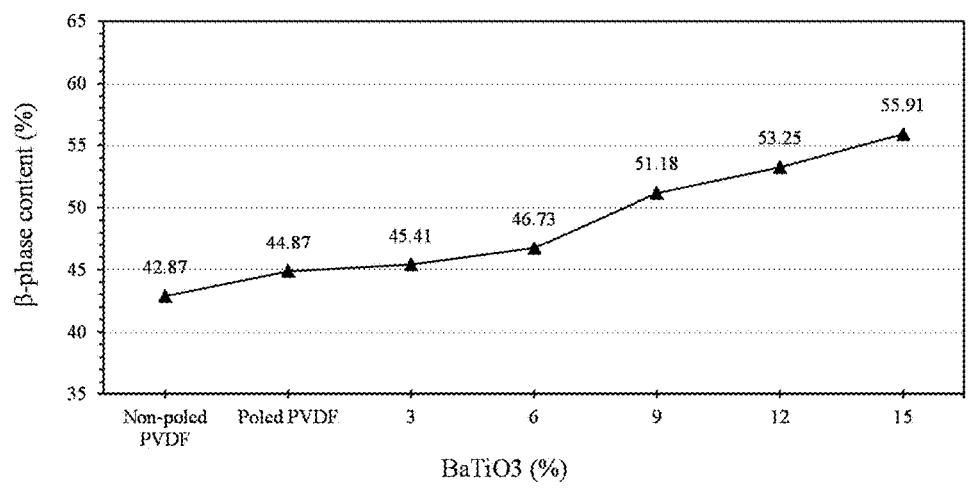
FIG. 6. 3-phase contents for non-poled 3D printed PVDF and poled 3D printed PVDF/BTO films with different BTO contents.

The highest amount of β-phase content (F(β)=55.91%) was achieved at 15 wt. %-BTO content among others as shown in FIG. 6. This is 30.41% increase compared to β-phase content of the non-poled PVDF (F(β)=42.87%). β-phase contents gradually increased with the increase of the BTO NPs contents. It is assumed that β-phase growth was affected mainly by the inclusion of BTO NPs because the nucleation of the (β-phase of the PVDF is proportional to the specific area of the NPs during thermal process such as filament extrusion and 3D printing [24]. In-situ poling 3D printing process slightly increased the β-phase content from 42.87% to 44.87%, as seen in FIG. 6. The increase of β-phase after poling process is in consistent with literature [9].

Piezoelectric Property Measurement

Figure 7:
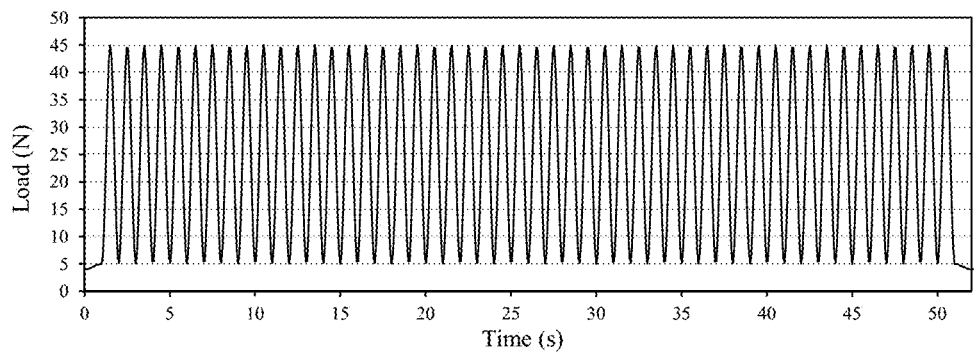
FIG. 7. Cyclic loads at 1 Hz applied on samples by fatigue machine.

Typically, a $d_{33}$ meter is used to measure the piezoelectric property for high piezoelectric materials such as ceramics. In this study, PVDF has a much lower piezoelectric constant than ceramics, therefore, it is not suitable to use the $d_{33}$ meter. Alternately, the piezoelectricity can be measured by feeding the sample's output signal to a charge amplifier circuit, the circuit would in turn amplify the output signal and allow for the characterization of the piezoelectric effect. Other studies have favored the use of dynamic force systems such as faraday cage [30]. Since the sample has high impedance and low piezoelectric coupling coefficient, the inventors simplified the characterization by using a fatigue load frame and picoammeter to measure the output current from 3D printed samples. 3D printed films were tested in a fatigue load frame that applies 50 cyclic controlled tension of 40 N at 1 Hz while the picoammeter measures current output within the pico-amp range as shown in FIG. 7.

Figure 8:
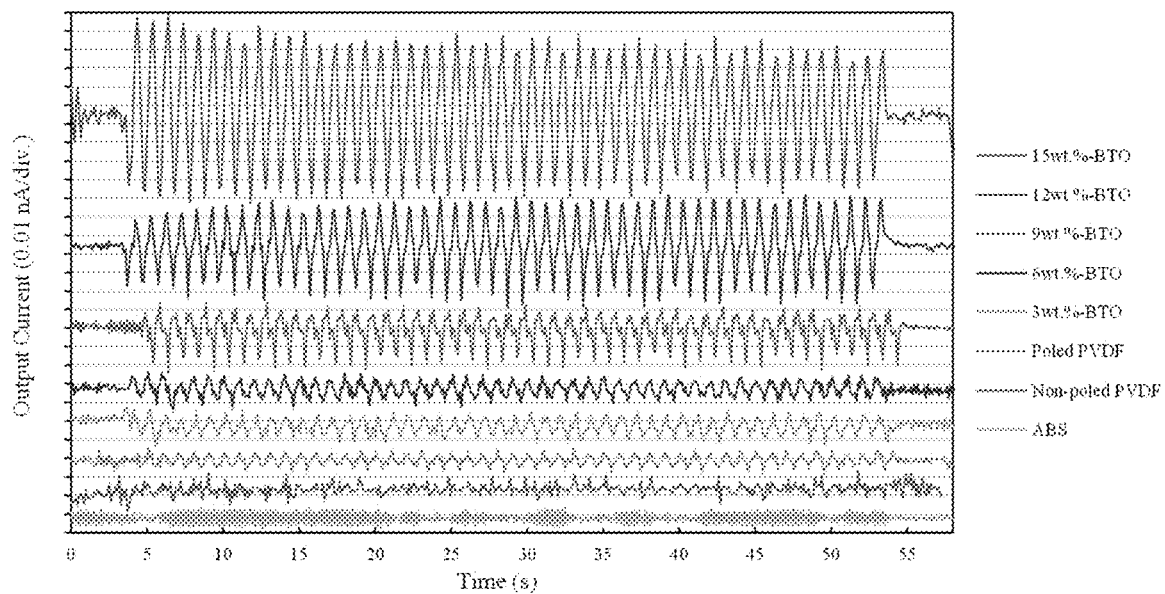
FIG. 8. Output currents of ABS, non-poled PVDF, poled PVDF, and BTO/PVDF films with different BTO contents under 40N.

FIG. 8 presents the current output results produced by 3D printed BTO/PVDF films fabricated under the same printing and poling parameters. It was measured that the highest current output is +0.0442 nA observed at 15 wt. %-BTO content. This is 1$^{033}$% increase compared to the output current of no in-situ PVDF. Then the current outputs are gradually decreasing as BTO NPs contents decrease (+0.0294 nA at 12 wt. %, +0.0168 nA at 9 wt. %, +0.0075 nA at 6 wt. %, +0.0073 nA at 3 wt. %, +0.0065 nA at 0wt. %-BTO, +0.0039 nA at no in-situ PVDF). Note that produced output current from Acrylonitrile Butadiene Styrene (ABS) is not periodical and not the same as applied force, therefore, it is considered as noise. It was confirmed that these output current results show a good agreement with those of FTIR (β-phase content's trend. The output current difference between poled and non-poled PVDF shows a good agreement with FTIR analysis indicating that in-situ poling 3D printing process played a role for β-phase transformation.

To calculate piezoelectric coefficient $d_{33}$, $$D_i = d_{ij}\sigma_j \quad (1)$$

where $D_i$ is the electrical displacement, $\sigma_j$ is the applied stress, and $d_{ij}$ is the piezoelectric coefficient. In this case, subscripts i and j are defined as 3. Therefore, the equation can then be expressed as $D_3 = d_{33}\sigma_3$. Considering areas of electrode and cross section, Eq. (1) can then be expressed as $$\frac{Q}{A_{cross}} = d_{33}\frac{F}{A_{cross}} \quad (2)$$

where Q is charge, $A_{cross}$ are areas of cross-section, and F is an applied force. Then, piezoelectric coefficient can be expressed as $$d_{33} = \frac{Q}{F} \quad (3)$$

Charges can be attained by numerical integration which is the similar method with Simpson's rule [31] expressed as $$Q_{(i)} = Q_{i-1} + \frac{I_i + I_{i+1}}{2} \times (t_{i+1} - t_i) \quad (4)$$

where $I_i$ is output current at i th and $t_i$ is the time at i and Eq. (5) can be rewritten as $$d_{33} = \frac{Q(i)}{40N} \quad (5)$$

$d_{33}$ can then be determined at $Q_{max}$ and $Q_{min}$ and each attained $d_{33}$ is divided by 2 to get $\pm d_{33}$ as Eq. (6) describes $$\pm d_{33} = \frac{d_{33}^{max} - d_{33}^{min}}{2} \quad (6)$$

Figure 9:
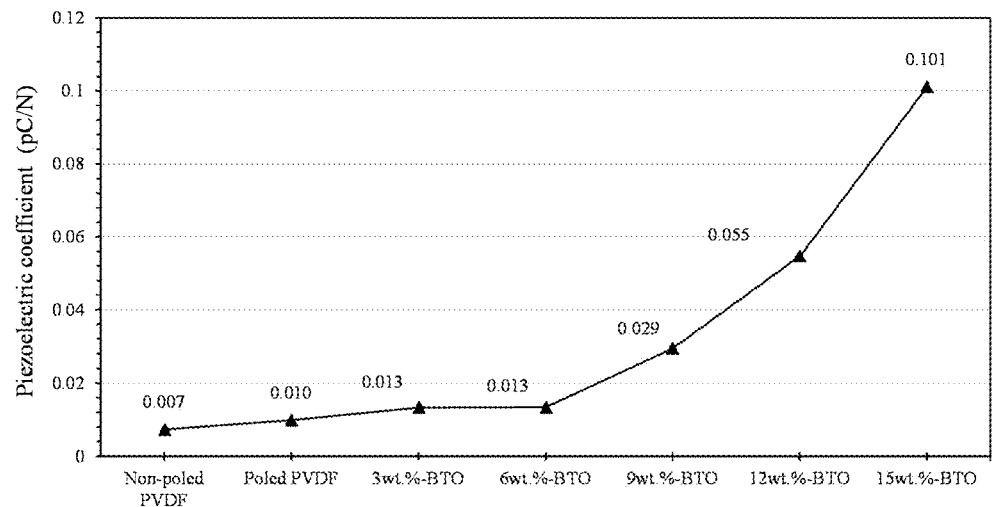
FIG. 9. Piezoelectric coefficients of non-poled PVDF, poled PVDF, and BTO/PVDF films with different BTO contents under 40N.

The calculated result determines the piezoelectric coefficients of 3D printed films. FIG. 9 indicates that the piezoelectric coefficient of the poled PVDF has been slightly increased by 0.01 pC/N (42% increase) compared to the non-poled PVDF. This demonstrates that the in-situ poling process slightly influenced β-phase transformation. However, by adding BTO particles the piezoelectric coefficient has significantly increased by 0.101 pC/N compared to non-poled PVDF. This is about 1342% increase that the BTO particles played an important role of enhancing piezoelectric coefficient.

Mechanical Property Analysis

Figure 10:
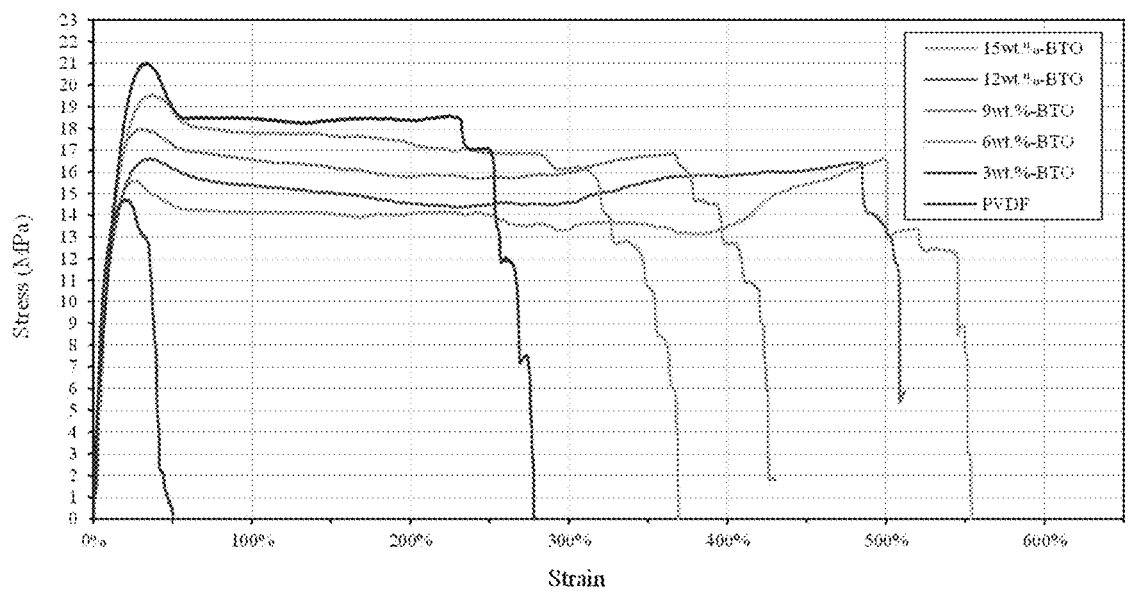
FIG. 10. Stress-strain curve at the strain rate of 5 mm/min for 3D printed PVDF/BTO films with different BTO contents.

The influence of the presence of BTO NPs in the mechanical properties of PVDF matrix was explored by analyzing the tensile and fatigue behaviors for the 3D printed BTO/PVDF nanocomposites films. In general, NPs increase tensile strength because mobility of the polymer chains is restricted by the dispersion of NPs under low NPs content [32]. However, under high NPs content, FIG. 10 indicates that the ultimate tensile strength of the 3D printed 3 wt. %-BTO/PVDF film was enhanced about 45.83% compared to PVDF and began to degrade as BTO NPs content increased and was decreased to 7.63% at 15 wt. %-BTO. This can be attributed to the following reasons: (1) BTO NPs are more likely to agglomerate and be heterogeneously distributed in higher loading systems. As shown in FIG. 4, it is demonstrated that BTO agglomerates increased in higher NPs content [33]; and (2) voids and micro-cracks were created during the fabrication process and increased with higher NPs content [34, 35]. This means that the total amount of cross linking of PVDF molecular chains was decreased. Therefore, these agglomerates and defects led to the degradation of the tensile strength after 3 wt. %-BTO. However, strain was increased linearly as BTO NPs contents decreased and the sample were elongated up to 500%. It is assumed that the more NPs prevented more crack initiation and propagation, therefore higher BTO NPs increased toughness property.

Figure 11:
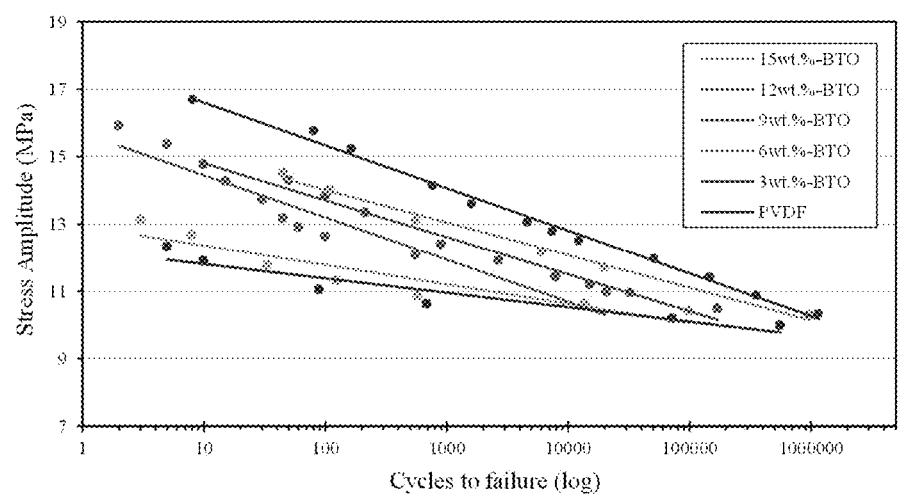
FIG. 11. Generalized S-N curve for 3D printed PVDF/BTO films with different BTO contents.

FIG. 11 indicates that fatigue strength at 3 wt. %-BTO shows the best enhancement compared with 3D printed PVDF. Then when the amount of BTO NPs content increased, there is almost a linear decrease in the fatigue strength. This decrease in the fatigue strength with higher BTO NPs can be explained by the following reasons: (1) during fatigue cycle, the NPs agglomerates act as steric obstacles which are restricting PVDF polymer flowing into the BTO agglomerates and eventually creating defects such as holes and voids between BTO and PVDF matrix [32]; and (2) aggregated NPs cause poor load transmission, stress accumulation, and subsequent origin of new crack [19, 32, 36]. Therefore, these agglomerates and aggregated NPs led to the degradation of the fatigue strength after 3 wt. %-BTO.

Enhanced-electric poling-assisted additive manufacturing (EPAM) process was introduced and BTO NPs fillers were used in PVDF matrix to enhance the piezoelectric property for sensor application. It was investigated that EPAM process slightly affected PVDF β-phase transformation, however BTO NPs fillers played a role of piezoelectric effect regarding transformation from α- to β-phase of PVDF due to nucleation on NPs surfaces during fabrication process based on the results of FTIR and output current. Therefore, the PVDF β-phase and output current at 15 wt. %-BTO increased by 3.41% and $1^{033}$%, respectively, when compared to non-poled PVDF. In SEM images, larger agglomerates and defects (i.e., voids and cracks) were formulated with increase of BTO NPs and resulted in degradation of tensile strength but provide better toughness. In addition, the highest tensile and fatigue strengths were seen at 3 wt. %-BTO and gradually decreased as the NPs contents increased because of defect creation, poor load transmission, stress accumulation from agglomerates and aggregated NPs during tensile and fatigue life measurement. For further research effort in order for better coupling and reinforcing between matrix and fillers, PVDF can be modified for hydrophilic property to increase adhesiveness during fabrication process and graphitic carbon based nanomaterial can be used to enhance mechanical-electrical connection.

B. PCP/Fluoropolymer/Carbon Nanomaterial Composites

Certain embodiments are directed to PCP/Fluoropolymer/carbon nanomaterial composite material. For example, MWCNTs can be used to improve the coupling coefficient by dispersing MWCNTs in the PVDF matrix to create stress reinforcing network, dispersant, and electron conducting functions for BTO nanoparticles. Various BTO and MWCNTs percentages of nanocomposite film are fabricated by the FDM 3D printing which can simplify the fabrication process while providing lower cost and design flexibility. Electrical outputs generated by the printed films are measured by fatigue load frame and demonstrated by human finger. The increasing MWCNTs and BT particles gradually increase the piezoelectric coefficient ($d_{31}$) by 129 pC/N with 0.4 wt. %-MWCNTs/18 wt. %-BTO. These results provide not only a technique to 3D print piezoelectric nanocomposites but also unique combination of BTO and PVDF with MWCNTs for applications in sensor and energy harvesting.

Recently, additive manufacturing technology has been introduced to printing piezoelectric 3D structures [40, 44, 45]. The fused deposition modeling (FDM) 3D printing process significantly improves homogeneous dispersion of BTO nanoparticles in the PVDF matrix, enhancing piezoelectric properties [44]. In addition, the FDM 3D printing technique is integrated with corona poling, which is one of the traditional poling processes, to simplify fabrication of piezoelectric PVDF films through sequential processes [40]. Kim et. al invented a 3D printing technique to optically fabricate photosensitive polymer based-BT nanocomposites with surface modification [43]. A photoliable polymer was induced to encapsulate piezoelectric nanoparticles during photo-polymerization. This technique can produce 3D structure of piezoelectric nanocomposites but is limited to combination with photosensitive polymers.

Embodiments of the invention are directed to FDM 3D printing of MWCNTs/BTO/PVDF nanocomposite films, where BTO ceramic nanoparticle fillers and a PVDF polymer matrix are used as piezoelectric constituents and MWCNTs as electrical and mechanical transfer network in the system for stress reinforcing, dispersant, and conducting function for nanoparticles. Various BTO (0-18 wt. %) and MWCNTs (0-0.4 wt. %) weight percentages are tested by SEM, XRD, FTIR, fatigue load frame, and human hands to analyze piezoelectric properties for use in pressure sensor and energy harvesting.

Figure 12A:
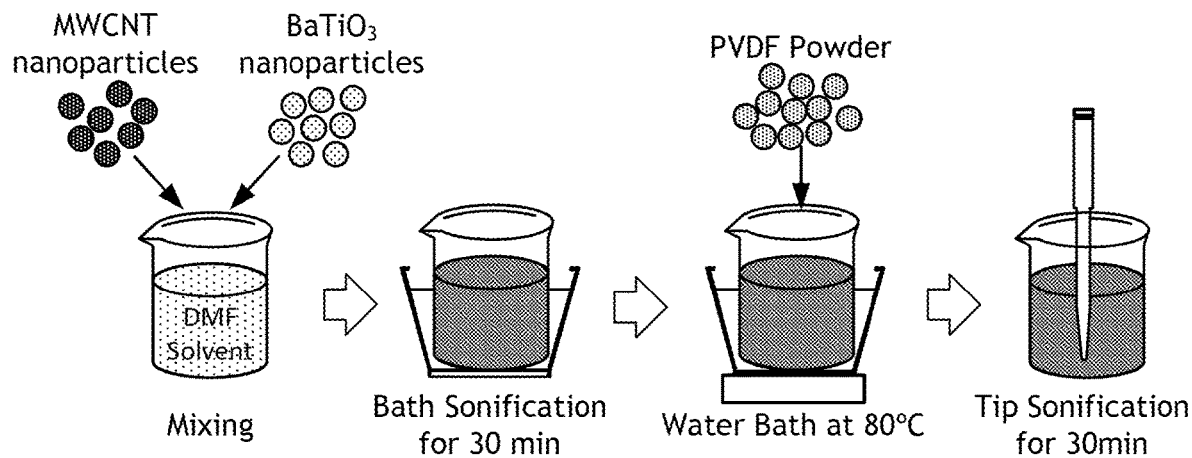
FIGS. 12A-12G. (A) schematic illustration of the synthesis process for MWCNT/BT/PVDF nanocomposites, (B) (i) extruded nanocomposite filament, (ii) 3D printed nanocomposite film device covered with silver paste, and (iii) FDM 3D printer, (C) schematic illustration of the printed nanocomposite sensor device, and SEM images of (D) BTO nanoparticles, (E) MWCNTs, (F) 0.4 wt. %-MWCNT/PVDF, and (G) 0.4 wt. %-MWCNT/18 wt. % BT/PVDF.
Figure 12B:
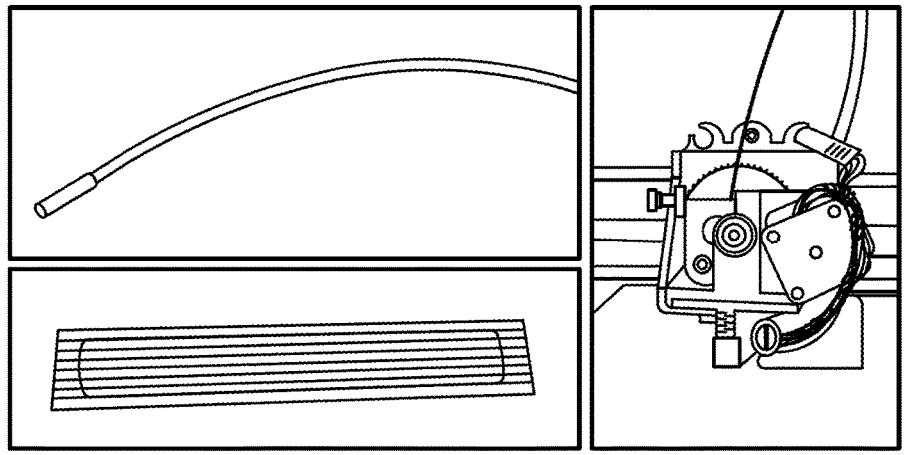

To fabricate continuous nanocomposites filament for 3D printing, commercial PVDF powder (MW~534,000; Sigma-Aldrich), BTO powder (700 nm; Inframat®), and MWCNTs powder (Diameter: 8-15 nm, length: 10-50 jam, Cheaptubes®) are mixed with N-Dimethylformamide solvent (DMF, OmniSolv®) via the solvent-casting method. The schematic illustration of the synthesis process is shown in FIG. 12A and detailed information is described herein below. These resultant thin sheets of nanocomposites are sliced down to be easily extruded by a filament extruder machine (Filabot®) and the nanocomposite filament (see FIG. 12B(i)) is used to 3D print a thick film by a fused deposition modeling 3D printer (Lulzbot® Taz 5) for a pressure sensor application. These filament extrusion and 3D printing processes are proved to provide uniform distribution of nanoparticles in the matrix, therefore enhancing piezoelectric and mechanical properties [44].

Figure 12C:
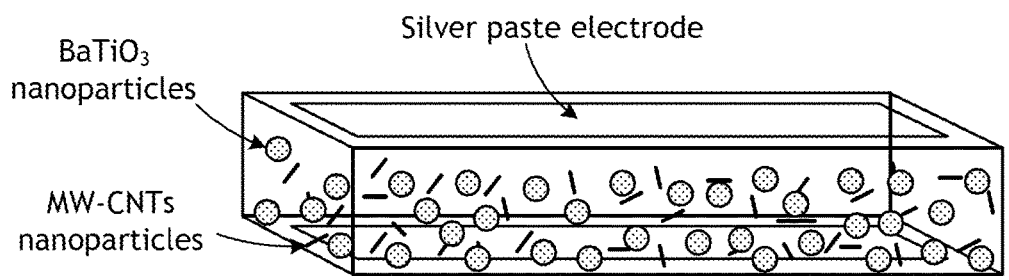

The printed nanocomposites film is depicted in FIG. 12C. BTO particles and PVDF polymer are not compatible with each other because of their respective hydrophobic and hydrophilic characteristics, so the combinations of these two offers a low stress transfer efficiency between the ceramic nanoparticles and the polymer matrix. MWCNTs are dispersed in this nanocomposites as a dispersant, for stress reinforcing, and for conducting functional agents between BTO particles and the PVDF polymer [42, 46]. These agents can efficiently load external stress onto BTO particles through the PVDF matrix and the piezoelectric charges generated by BTO particles are conducted through MWCNTs. In addition, MWCNTs promote high β-phase formation of PVDF as well as BTO particles [41].

Figures 12D, 12E:
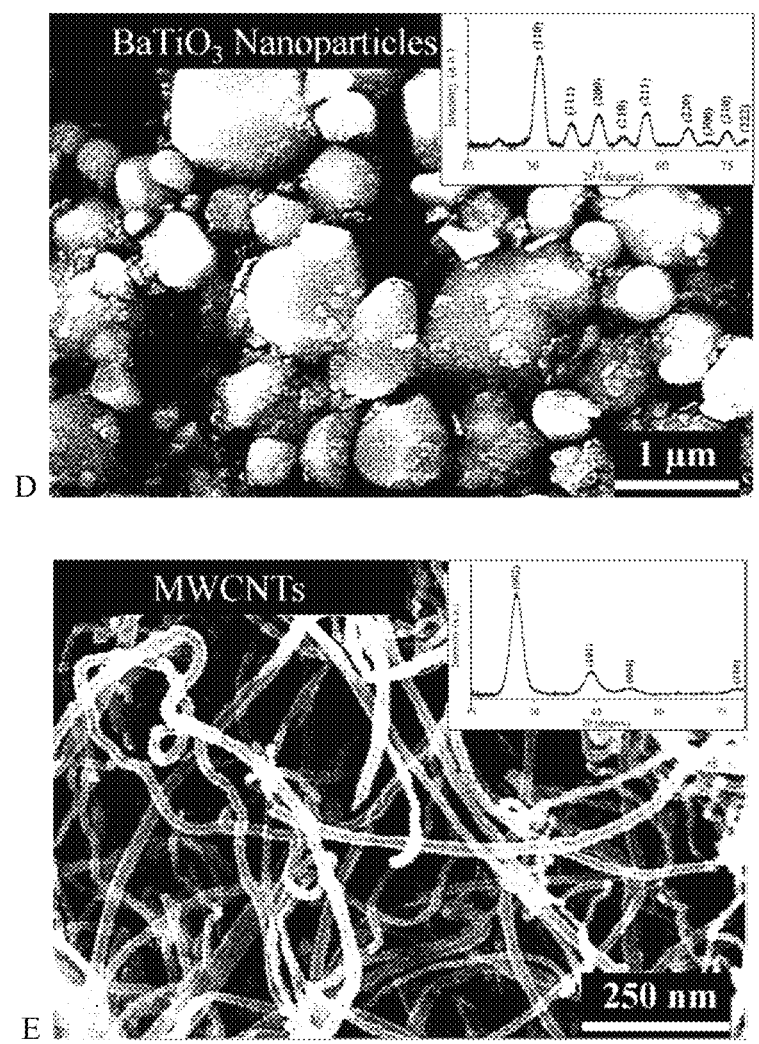
Figures 12F, 12G:
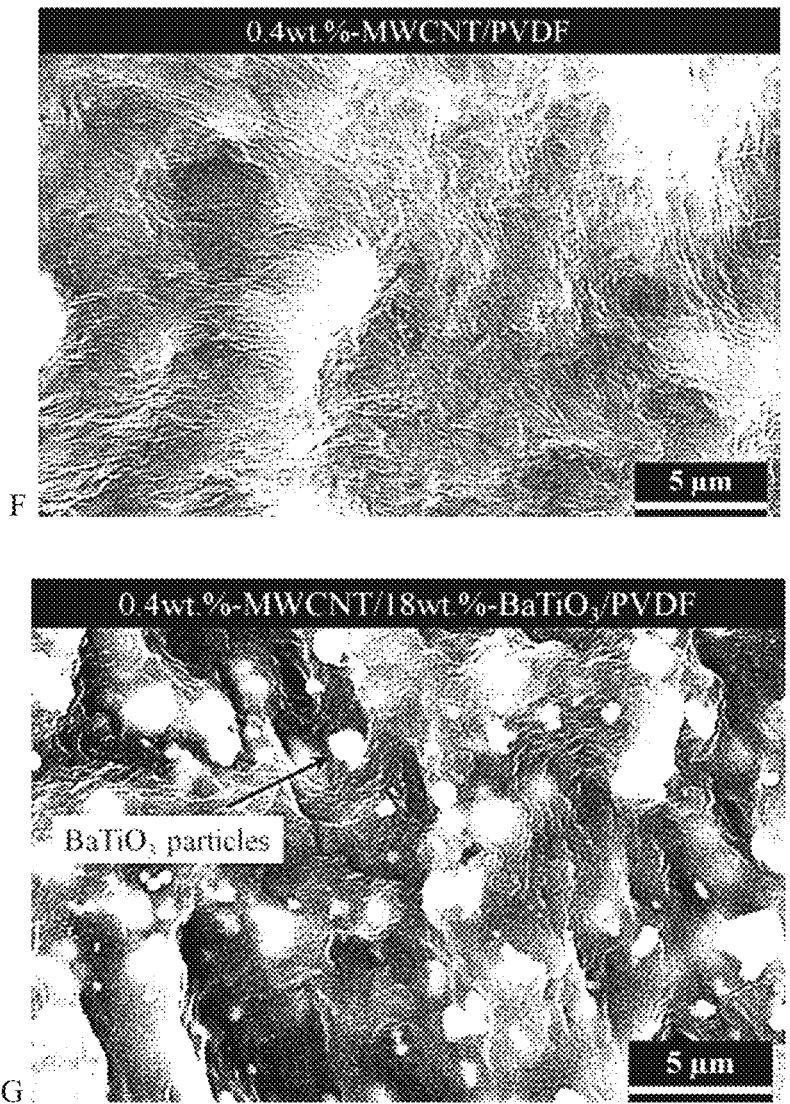

The morphology and crystalline structure of the materials are analyzed by scanning electron microscopy (SEM, TM-1000, Hitachi) and X-ray diffraction (XRD, D8 Discover diffractometer, Bruker). SEM images and spectra in FIG. 12D and FIG. 12E demonstrate commercially purchased pure BT nanoparticles and MWCNTs. FIG. 12F and FIG. 12G indicate the well distributed MWCNTs and agglomeration of BTO nanoparticles are observed to increase as its percentage increases in the PVDF matrix.

Fourier transform infrared spectroscopy (FTIR, Agilent Technologies Cary 630 ATR-IR) analyses are performed in the 600-1600 $cm^{-1}$ wavenumber range at room temperature to characterize an infrared spectrum of absorption of the printed nanocomposites [47-49]. For piezoelectric property analysis, piezoelectric output voltage and current in a fatigue load frame (Bose ElectroForce-BioDynamic, TA Instruments), are measured by Voltmeter (InstruNet i-400), and Pico ammeter (Keithley 6485) as shown in FIG. 13A(ii) [40, 44]. Sample can be fabricated with large area, but due to the geometry of the fatigue grip, nanocomposites samples were printed with dimensions of 6×35×0.55 mm as shown in FIG. 13A(i). To quantify the piezoelectric property of the printed film, samples are prepared with silver conductive paint electrodes on both surfaces. The electrodes are then attached with copper (Cu) tape to allow a proper connection to the Pico ammeter as shown in FIG. 13A(ii). Cyclic force is applied on the printed nanocomposites to measure periodic output current and voltage; the fatigue load frame generated 30 cyclic loads on the sample at 0.5-4 Hz while the Pico ammeter measured the current output [44]. To prevent noise and artifacts from the fatigue machine during measurement, the two grips handling the film are covered with electrical insulating tape.

Figure 13D:
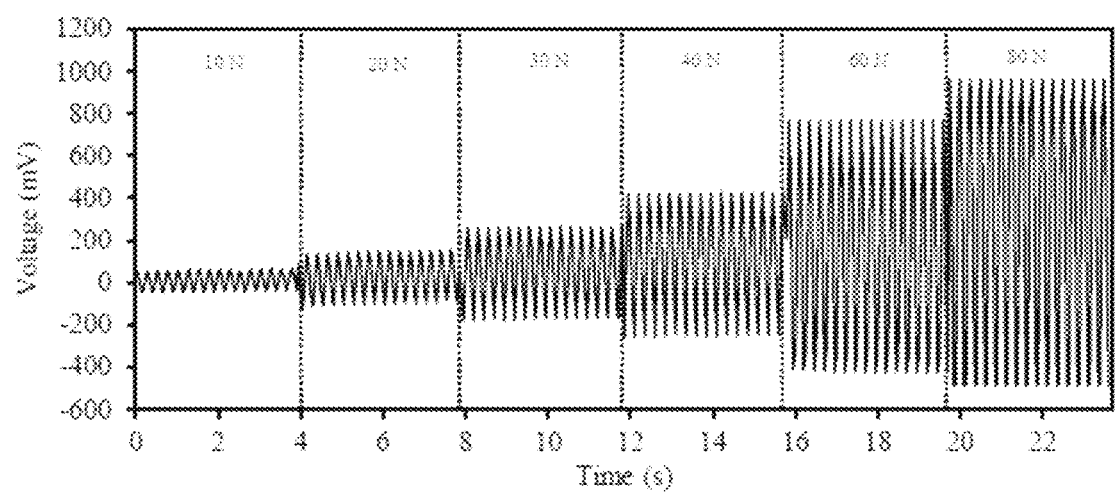

Electric poling is applied under 3 MV/m for 15 hours to the printed nanocomposite films after 3D printing fabrication. FIG. 13B(i) and FIG. 13B(ii) show output voltage and current produced by the printed nanocomposites film before and after the electric poling process. Amplitude of voltage outputs generated from the nanocomposite films before and after poling treatment increases from +0 mV to +340 mV and current outputs from +0.084 nA to +0.94 nA. BTO nanoparticles dispersed in matrix should be polarized through post-poling process. This result indicates that electric poling activated piezoelectricity of the BTO particles and that the BTO particles and MWCNTs are mechanically and electrically interacting with each other. FIG. 13C(i) and FIG. 13C(ii) indicate results of voltage outputs produced by various MWCNTs and BTO nanoparticles percentages. In FIG. 13C(i), 12 wt. %-BT/PVDF nanocomposites film is characterized without MWCNTs to study the role of MWCNTs within the printed nanocomposites. No reliable output signal is observed. However, with an increase in MWCNT content the output voltages increased by +192 mV under 0.4 wt. %-MWCNTs which is the maximum percentage over which electrical break down occurs during electrical poling. This increase of the voltage amplitude indicates that MWCNTs play a significant role as a stress reinforcing agent within the nanocomposites. In FIG. 13C(ii), when there is 0.4 wt. %-MWCNTs in the PVDF matrix and no BTO nanoparticle content, the piezoelectric output voltage generated is ±49 mV. This is because PVDF β-phase was formed on high specific surface areas of MWCNTs [41]. As BTO particle content increases, the voltage outputs are increases up to +340 mV at 18 wt. %-BTO which is the maximum percentage of BTO content that can be extruded in the FDM 3D printer nozzle. With 0.4 wt. %-MWCNTs/18 wt. %-BT/PVDF film (which showed the highest generated output voltage), output voltages were measured under various external forces applied by fatigue load frame. FIG. 13D shows that a higher amplitude of output voltages was produced at higher external forces, increased by +725 mV under 80 N.

Figure 15A:
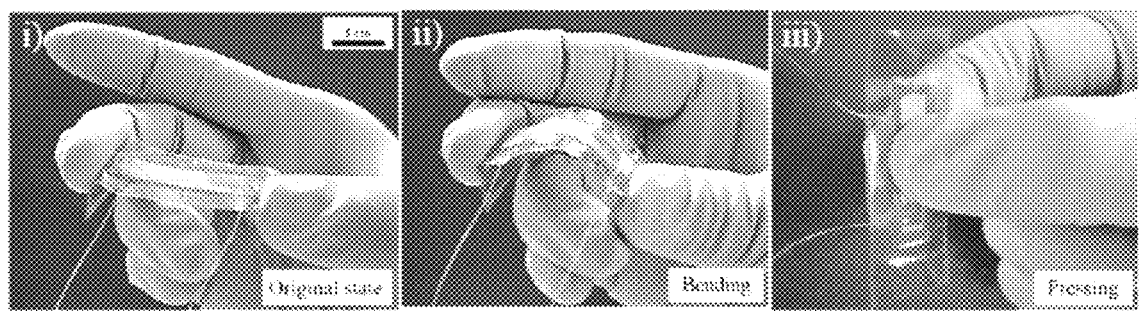
FIGS. 15A-15C. (A) Optical images of the printed nanocomposite sensor device in (i) original, (ii) bending, and (iii) pressing states, (B) the measured voltage output signals of 0.4 wt. %-MWCNT/18 wt. %-BT/PVDF film generated by (i) bending and (ii) pressing motions by human fingers, (C) the durability test result of 0.4 wt. %-MWCNT/18 wt. %-BT/PVDF film under 2,000 periodic cycles (4 Hz) using fatigue load frame.

FTIR analysis was performed to characterize the degree of crystallinity of α- and β-phases of the PVDF before and after the electric poling process. IR absorption bands at 766 and 840 $cm^{-1}$ which are respectively characteristic of α- and β-phases are observed for analysis of the phase transformation. Based on the results of IR absorption bands, the β-phase contents of each printed nanocomposite film are calculated. In FIG. 15A, 3-phase contents significantly increased after electric poling and as MWCNTs increased by 70.3% of β-phase at 0.4 wt. %-MWCNTs/12 wt. %-BT/PVDF. It is certain that MWCNTs led to a high degree of conversion from α-phase to β-phase. Under the same amount of MWCNTs (0.4 wt. %), the analysis of β-phase contents showed an increasing trend as BTO particles were increased.

Figure 14A:
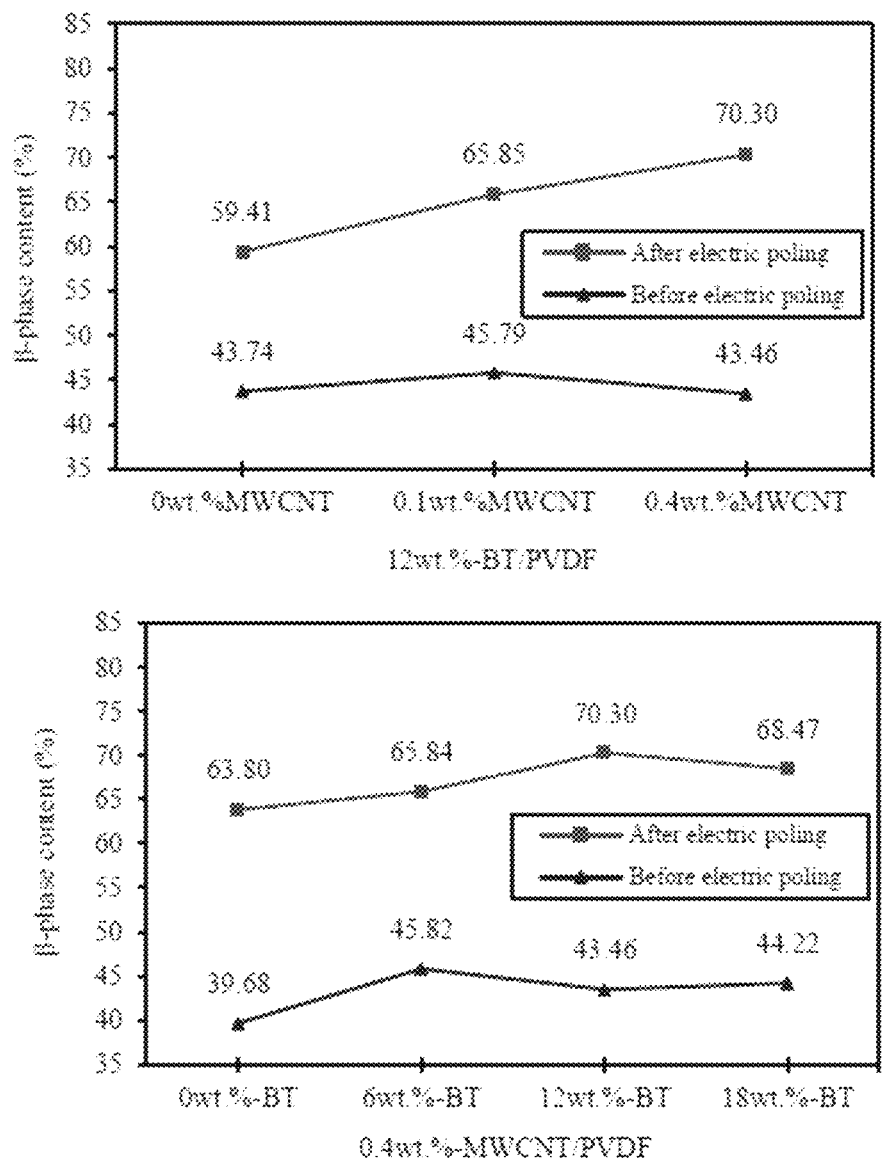
FIGS. 14A-14B. (A) 3-phase contents of the printed nanocomposites with various MWCNTs and BT particle contents before and after electric poling process and (B) piezoelectric coefficients ($d_{31}$) of the printed nanocomposites with various MWCNTs and BT particles contents.
Figure 14B:
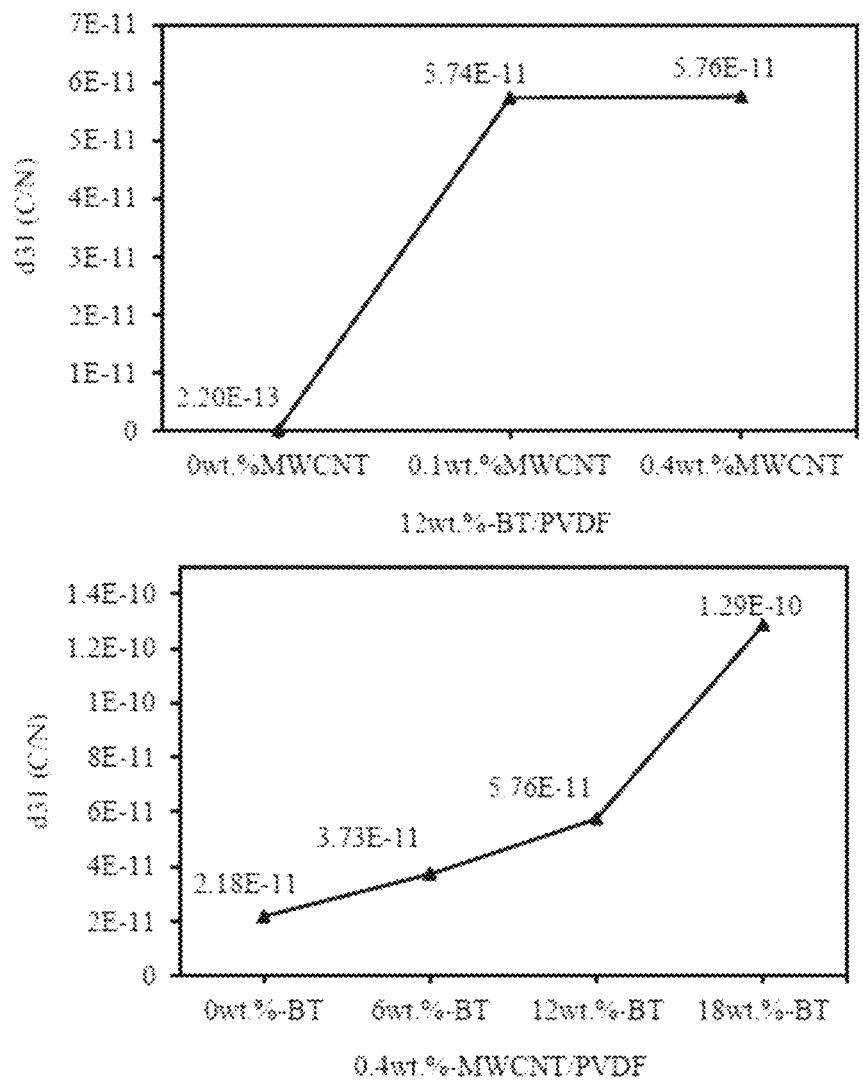

Based on the voltage output results of FIG. 13C(i) and FIG. 13C(ii), piezoelectric coefficients ($d_{31}$) of each printed nanocomposite film are calculated with various compositions using measured relative permittivity. In FIG. 14B, $d_{31}$ has significantly increased from 0.22 to 57.6 pC/N when MWCNTs' content increases under 12 wt. %-BTO. This indicates that the addition of MWCNTs enhances performance of stress reinforcing between BTO particles and the matrix. Under the same amount of MWCNTs (0.4 wt. %), $d_{31}$ is tested with various percentage of BTO particles. The result indicates that the $d_{31}$ increases from 21.8 (0 wt. %-BTO) to 129 pC/N (18 wt. %-BTO) as BTO particles increase, a 492% increase. The measured $d_{31}$ of the nanocomposites is comparable with pure BTO ceramics or composites (79~185 pC/N) [50, 51] and one order of magnitude higher than those previously developed BTO/CNT/PVDF composites system, thus overcomes the low direct piezoelectric coupling associated with piezoelectric polymer composites.

Figure 15B:
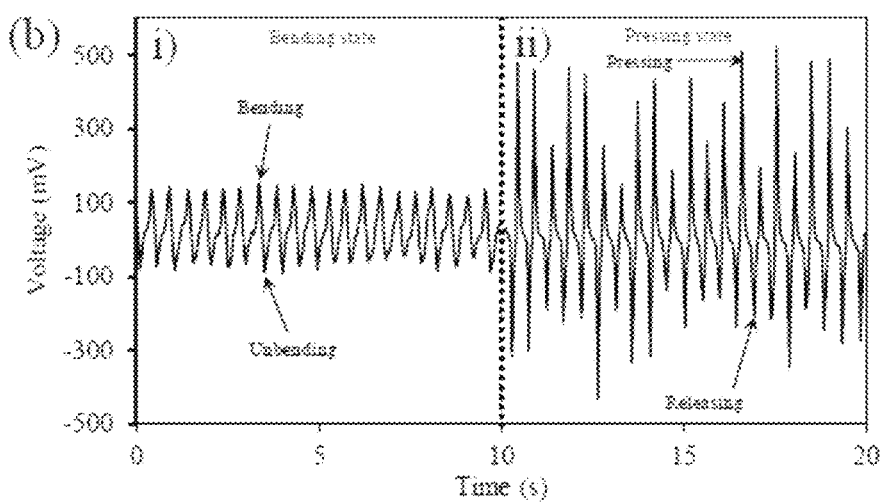
Figure 15C:
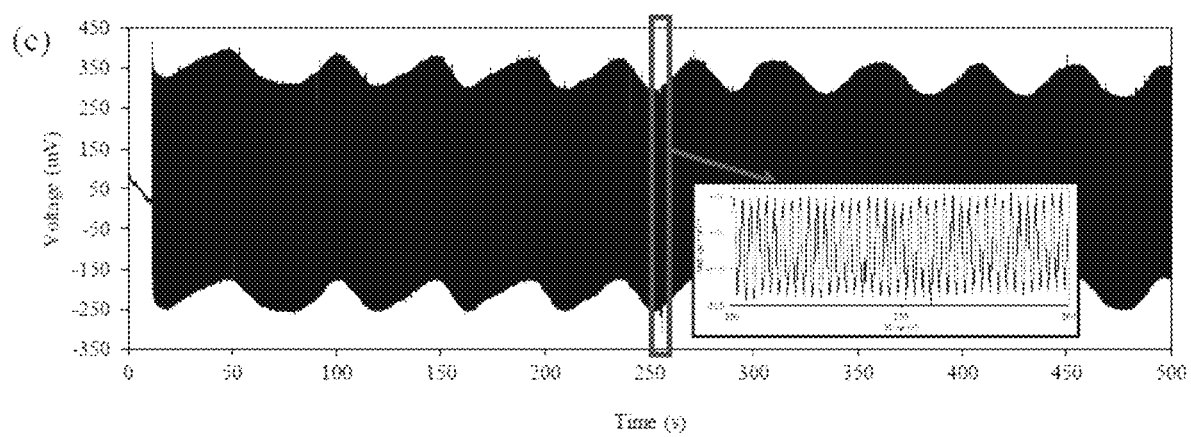

To further demonstrate the piezoelectric sensor application, the feasibility of using printed piezoelectric nanocomposites for pressure sensor application was demonstrated. The output voltage signal is measured when bending and pressing by hand shown in FIG. 15. FIG. 14A(i) shows the printed nanocomposites film and hands covered respectively by Kapton film and gloves, to exclude external electrostatic charges. Two Cu wires attached on both silver electrodes are extended to connect to the data acquisition machine. In FIG. 15A(ii), upon bending the sample, the output voltage was measured to be +120 mV. Upon pressing in the middle of the sample, the amplitude of the output voltage increased to +435 mV at most. In FIG. 15C, durability test is implemented at 4 Hz frequency for 2000 cycles to confirm the mechanical stability of the printed nanocomposite film. The amplitude of voltage output remains constant after 2000 cycles. The printed film also shows the same piezoelectric stability after 3 days. The bottom inset of FIG. 15C shows the magnified voltage signal from 250 to 260 sec.

The MWCNT/BTO/PVDF nanocomposite film is printed by FDM 3D printing technique for use in sensor and energy harvesting applications. The FDM 3D printing technique can simplify fabrication process of piezoelectric film with lower cost and greater design flexibility compared to traditional fabrication processes. Various BTO and MWCNTs percent nanocomposite films were printed, characterized, and tested by SEM, XRD, FTIR, fatigue load frame, and human finger to ensure the piezoelectric performance. It is demonstrated that MWCNTs plays important roles of transforming PVDF α- to β-phase and enhancing the efficiency of mechanical to electrical conversion between BTO and PVDF interfaces. The increasing MWCNTs' percent in the system results in an increase in electrical output which, indicates that the increased surface areas of MWCNTs interacts well with BTO nanoparticles, therefore providing a stress reinforcing effect between the BTO and PVDF. In addition, increasing the BTO particles' percent in the system showed an increase in electrical output by ±340 mV under 40 N and +725 mV under 80 N at 18 wt. %. Piezoelectric coefficient ($d_{31}$) is calculated and the results show good agreement with electrical output generated by the printed nanocomposite films. The highest $d_{31}$ is 129 pC/N at 0.4 wt. %-MWCNTs/18 wt. %-BT/PVDF, comparable to pure BT ceramic. By bending and pressing with fingers, the printed film generates about +120 mV and +435 mV, respectively. The mechanical stability of the printed nanocomposite film is proved by durability test for 2000 cycles without any amplitude changes. These results demonstrate feasibility in its commercial application. These compounds and the FDM 3D printing technique are expected to broaden the use of additive manufacturing to 3D print piezoelectric nanocomposite device for sensor and energy harvesting applications.

Synthesis of nanocomposites via solvent-casting procedure

The BTO and PVDF powder are mixed via a solvent-casting process which is an alternative method of mechanical mixing for uniform distribution of BTO nanoparticles. Solution is prepared by dissolving PVDF powder in DMF solvent (e.g., at a 1:10 weight ratio). Solution is then placed in a water bath at 80° C. and is stirred using a magnetic stir bar at 300 rpm for approximately 30 minutes. After the PVDF powder fully dissolves, BT powder is introduced to the solution. This attained nanocomposite solution is then heated and stirred using the same parameters for approximately 15 minutes. BT build up at the bottom of solution is addressed by ultra-sonication (Branson Sonifier 450) for 20 minutes. DMF solvent is then evaporated by dispersing nanocomposites solution onto a glass substrate and heated to a temperature of 80° C. for 12 hrs. The procedure yields a thin sheet of BTO/PVDF nanocomposite, and these casted nanocomposites are sliced down to be easily extruded by filament extruder machine (Filabot). The diameter of the extruded filament and extruding temperature are 2.9 mm and 195° C. respectively.

REFERENCES

1. Ge, Q., et al., *Active origami by 4D printing*. Smart Materials and Structures, 2014. 23(9): p. 094007.
2. Ge, Q., et al., *Multimaterial 4D printing with tailorable shape memory polymers*. Scientific Reports, 2016. 6.
3. Kawai, H., *The piezoelectricity of poly (vinylidene fluoride)*. Japanese Journal of Applied Physics, 1969. 8(7): p. 975.
4. Ye, Y., et al., *Phase transitions of poly (vinylidene fluoride) under electric fields*. Integrated Ferroelectrics, 2006. 80(1): p. 245-251.
5. Bharti, V., T. Kaura, and R. Nath, *Ferroelectric hysteresis in simultaneously stretched and corona-poled PVDF films*. IEEE transactions on dielectrics and electrical insulation, 1997. 4(6): p. 738-741.
6. Lanceros-Mendez, S., et al., *FTIR and DSC studies of mechanically deformed/3-PVDF films*. Journal of Macromolecular Science, Part B, 2001. 40(3-4): p. 517-527.
7. Salimi, A. and A. Yousefi, *Conformational changes and phase transformation mechanisms in PVDF solution-cast films*. Journal of Polymer Science Part B: Polymer Physics, 2004. 42(18): p. 3487-3495.
8. Seminara, L., et al., *Electromechanical characterization of piezoelectric PVDF polymer films for tactile sensors in robotics applications*. Sensors and Actuators A: Physical, 2011. 169(1): p. 49-58.
9. Lee, C. and J. A. Tarbutton, *Electric poling-assisted additive manufacturing process for PVDF polymer-based piezoelectric device applications*. Smart Materials and Structures, 2014. 23(9): p. 095044.
10. Corral-Flores, V. and D. Bueno-Baques, *Flexible Ferroelectric BaTiO3-PVDF Nanocomposites*. 2011: INTECH Open Access Publisher.
11. Shrout, T. R. and S. J. Zhang, *Lead-free piezoelectric ceramics: Alternatives for PZT?* Journal of Electroceramics, 2007. 19(1): p. 113-126.
12. Takenaka, T., K.-i. Maruyama, and K. Sakata, *(Bi½Na½) TiO3-BaTiO3 system for lead-free piezoelectric ceramics*. Japanese Journal of Applied Physics, 1991. 30(9S): p. 2236.
13. Jiang, Y., et al., *Study of thermally poled and corona charged poly (vinylidene fluoride) films*. Polymer Engineering & Science, 2007. 47(9): p. 1344-1350.
14. Szabo, J. P., et al. *Elastomeric composites with high dielectric constant for use in Maxwell stress actuators*. in Smart Structures and Materials. 2003. International Society for Optics and Photonics.

15. Nagata, K. and T. Kiyota, *Piezoelectric Properties of Low Coercive-Field BaTiO3 Ceramics and Its Application*. Japanese journal of applied physics, 1989. 28(S2): p. 98.
16. Kim, K., et al., *3D optical printing of piezoelectric nanoparticle-polymer composite materials*. ACS nano, 2014. 8(10): p. 9799-9806.
17. Dickens, B., et al., *Hysteresis measurements of remanent polarization and coercive field in polymers*. Journal of applied physics, 1992. 72(9): p. 4258-4264.
18. Granstrom, J., et al., *Energy harvesting from a backpack instrumented with piezoelectric shoulder straps*. Smart Materials and Structures, 2007. 16(5): p. 1810.
19. Sanchez, F. A. and J. Gonzalez-Benito, *PVDFBaTiO3/ carbon nanotubes ternary nanocomposites: Effect of nanofillers and processing*. Polymer Composites, 2015.
20. Kagan, V. A., I. Palley, and N. Jia, *Plastics part design: Low cycle fatigue strength of glass-fiber-reinforced polyethylene terephthalate (PET)*. Journal of reinforced plastics and composites, 2004. 23(15): p. 1607-1614.
21. Gregorio Jr, R. and M. Cestari, *Effect of crystallization temperature on the crystalline phase content and morphology of poly (vinylidene fluoride)*. Journal of Polymer Science Part B: Polymer Physics, 1994. 32(5): p. 859-870.
22. Sencadas, V., R. Gregorio Filho, and S. Lanceros-Mendez, *Processing and characterization of a novel nonporous poly (vinilidene fluoride) films in the β phase*. Journal of Non-Crystalline Solids, 2006. 352(21): p. 2226-2229.
23. Nalwa, H. S., *Recent developments in ferroelectric polymers*. Journal of Macromolecular Science, Part C: Polymer Reviews, 1991. 31(4): p. 341-432.
24. Mendes, S. F., et al., *Effect of filler size and concentration on the structure and properties of poly (vinylidene fluoride)/BaTiO3 nanocomposites*. Journal of Materials Science, 2012. 47(3): p. 1378-1388.
25. Martins, P., A. Lopes, and S. Lanceros-Mendez, *Electroactive phases of poly (vinylidene fluoride): determination, processing and applications*. Progress in polymer science, 2014. 39(4): p. 683-706.
26. Benz, M. and W. B. Euler, *Determination of the crystalline phases of poly (vinylidene fluoride) under different preparation conditions using differential scanning calorimetry and infrared spectroscopy*. Journal of applied polymer science, 2003. 89(4): p. 1093-1100.
27. Mandal, D., K. Henkel, and D. SchmeiÆer, *The electroactive β-phase formation in Poly (vinylidene fluoride) by goldnanoparticles doping*. Materials Letters, 2012. 73: p. 123-125.
28. Ince-Gunduz, B. S., et al., *Impact of nanosilicates on poly (vinylidene fluoride) crystal polymorphism: Part 1. Melt-crystallization at high supercooling*. Polymer, 2010. 51(6): p. 1485-1493.
29. Sencadas, V., et al. *α-to β Transformation on PVDF films obtained by uniaxial stretch*. in *Materials science forum*. 2006. Trans Tech Publ.
30. Park, K. I., et al., *Flexible nanocomposite generator made of BaTiO3 nanoparticles and graphitic carbons*. Advanced Materials, 2012. 24(22): p. 2999-3004.
31. Stili, E. and D. F. Mayers, *An introduction to numerical analysis*. 2003: Cambridge university press.
32. Shen, M.-Y., et al., *Mechanical properties and tensile fatigue of graphene nanoplatelets reinforced polymer nanocomposites*. Journal of Nanomaterials, 2013. 2013: p. 1.
33. Zhou, Y., et al., *Experimental study on the thermal and mechanical properties of multi-walled carbon nanotube-reinforced epoxy*. Materials Science and Engineering: A, 2007. 452: p. 657-664.
34. Zhou, Y., et al., *Fabrication and characterization of carbon/epoxy composites mixed with multi-walled carbon nanotubes*. Materials Science and Engineering: A, 2008. 475(1): p. 157-165.
35. Choi, Y.-K., et al., *Mechanical and physical properties of epoxy composites reinforced by vapor grown carbon nanofibers*. Carbon, 2005. 43(10): p. 2199-2208.
36. Yang, S.-Y., et al., *Synergetic effects of graphene platelets and carbon nanotubes on the mechanical and thermal properties of epoxy composites*. Carbon, 2011. 49(3): p. 793-803.
37. M. T. Sebastian and H. Jantunen, "*Polymer-ceramic composites of 0-3 connectivity for circuits in electronics: a review*," International Journal of Applied Ceramic Technology, vol. 7, pp. 415-434, 2010.
38. A. Salimi and A. Yousefi, "Conformational changes and phase transformation mechanisms in PVDF solution—cast films," Journal of Polymer Science Part B: Polymer Physics, vol. 42, pp. 3487-3495, 2004.
39. Y. Jiang, Y. Ye, J. Yu, Z. Wu, W. Li, J. Xu, et al., "Study of thermally poled and corona charged poly (vinylidene fluoride) films," Polymer Engineering & Science, vol. 47, pp. 1344-1350, 2007.
40. K. Hoejin, T. Fernando, W. Yanyu, V. Dino, L. Yirong, and T. Tzu-Liang, "Integrated 3D printing and corona poling process of PVDF piezoelectric films for pressure sensor application," Smart Materials and Structures, 2017.
41. Y. Ahn, J. Y. Lim, S. M. Hong, J. Lee, J. Ha, H. J. Choi, et al., "Enhanced piezoelectric properties of electrospun poly (vinylidene fluoride)/multiwalled carbon nanotube composites due to high β-phase formation in poly (vinylidene fluoride)," The Journal of Physical Chemistry C, vol. 117, pp. 11791-11799, 2013.
42. K. I. Park, M. Lee, Y. Liu, S. Moon, G. T. Hwang, G. Zhu, et al., "Flexible nanocomposite generator made of BaTiO3 nanoparticles and graphitic carbons," Advanced Materials, vol. 24, pp. 2999-3004, 2012.
43. K. Kim, W. Zhu, X. Qu, C. Aaronson, W. R. McCall, S. Chen, et al., "3D optical printing of piezoelectric nanoparticle-polymer composite materials," ACS nano, vol. 8, pp. 9799-9806, 2014.
44. H. Kim, T. Fernando, M. Li, Y. Lin, and T.-L. B. Tseng, "Fabrication and characterization of 3D printed BaTiO3/PVDF nanocomposites," Journal of Composite Materials, p. 0021998317704709, 2017.
45. C. Lee and J. A. Tarbutton, "Electric poling-assisted additive manufacturing process for PVDF polymer-based piezoelectric device applications," Smart Materials and Structures, vol. 23, p. 095044, 2014.
46. A. Mandal and A. K. Nandi, "Ionic liquid integrated multiwalled carbon nanotube in a poly (vinylidene fluoride) matrix: formation of a piezoelectric β-polymorph with significant reinforcement and conductivity improvement," ACS applied materials & interfaces, vol. 5, pp. 747-760, 2013.
47. X. Cai, T. Lei, D. Sun, and L. Lin, "A critical analysis of the α, β and γ phases in poly (vinylidene fluoride) using FTIR," RSC Advances, vol. 7, pp. 15382-15389, 2017.
48. D. Mandal, K. Henkel, and D. SchmeiÆer, "The electroactive β-phase formation in Poly (vinylidene fluoride) by gold nanoparticles doping," Materials Letters, vol. 73, pp. 123-125, 2012.

49. K. Matsushige, K. Nagata, S. Imada, and T. Takemura, "The II-I crystal transformation of poly (vinylidene fluoride) under tensile and compressional stresses," Polymer, vol. 21, pp. 1391-1397, 1980.

50. T. Karaki, K. Yan, T. Miyamoto, and M. Adachi, "Lead-free piezoelectric ceramics with large dielectric and piezoelectric constants manufactured from $BaTiO_3$ nanopowder," Japanese Journal of Applied Physics, vol. 46, p. L97, 2007.

51. L. Dong, D. S. Stone, and R. S. Lakes, "Enhanced dielectric and piezoelectric properties of x $BaZrO3$-(1-x) $BaTiO_3$ ceramics," Journal of Applied Physics, vol. 111, p. 084107, 2012.

The invention claimed is:

1. A method of making a piezoelectric ceramic particle (PCP)/multi-walled carbon nanotube (MWCNT)/fluoropolymer filament comprising:
   (a) mixing a PCP, MWCNT and fluoropolymer powder for forming a PCP/MWCNT/fluoropolymer composite comprising 0.01 wt. % to 0.4 wt. % of MWCNT and a uniform distribution of PCPs in the PCP/MWCNT/fluoropolymer composite; and
   (b) forming the PCP/MWCNT/fluoropolymer composite into a printing filament.

2. The method of claim 1, further comprising:
   (a) dissolving the fluoropolymer powder in an organic solvent at a weight ratio of 1:5 to 1:15 and adding the PCP powder and MWCNT to the fluoropolymer solution;
   (b) evaporating the organic solvent to form a PCP/MWCNT/fluoropolymer nanocomposite; and
   (c) extruding the PCP/MWCNT/fluoropolymer nanocomposite to form a filament.

3. The method of claim 1, wherein the fluoropolymer is PVDF.

4. The method of claim 1, wherein the PCP is barium titanate (BTO).

5. The method of claim 3, further comprising mixing a carbon nanomaterial prior to solvent casting.

6. The method of claim 2, wherein the organic solvent is DMF, DMSO.

7. The method of claim 2, wherein the weight ratio fluoropolymer to organic solvent is about 1:10.

8. The method of claim 4, wherein the BTO/MWCNT/fluoropolymer nanocomposite is extruded at a temperature of 100 to 350° C.

9. The method of claim 1, wherein the filament has a diameter of 0.5 to 4 mm.

* * * * *